(12) United States Patent
Nagasaka

(10) Patent No.: US 7,505,031 B2
(45) Date of Patent: Mar. 17, 2009

(54) MONITOR DISPLAY CONTROL APPARATUS AND MONITOR DISPLAY CONTROL METHOD

(75) Inventor: Chikao Nagasaka, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 653 days.

(21) Appl. No.: 10/932,314

(22) Filed: Sep. 2, 2004

(65) Prior Publication Data

US 2005/0083299 A1    Apr. 21, 2005

(30) Foreign Application Priority Data

Sep. 4, 2003    (JP) .............................. 2003-312942

(51) Int. Cl.
   *G09G 5/00*    (2006.01)
(52) U.S. Cl. ....................................... 345/156; 701/209
(58) Field of Classification Search ................. 345/156, 345/157, 173; 701/209, 207, 210, 211, 208; 340/988
   See application file for complete search history.

(56) References Cited

U.S. PATENT DOCUMENTS 5,983,158 A * 11/1999 Suzuki et al. ............... 701/209

7,061,466 B1 * 6/2006 Moore et al. ................ 345/156

FOREIGN PATENT DOCUMENTS

| JP | 08-069515 | 3/1996 |
| JP | 08-219803 | 8/1996 |
| JP | 2002-081942 | 3/2002 |
| JP | 2002-116040 A | 4/2002 |
| JP | 2002-257558 A | 9/2002 |

* cited by examiner

*Primary Examiner*—Kevin M. Nguyen
(74) *Attorney, Agent, or Firm*—Roberts Mlotkowski Safran & Cole, P.C.; Thomas W. Cole

(57) ABSTRACT

The present invention is to provide a monitor display control apparatus and a monitor display control method, in which ease of operation of scrolling a map image can be improved with an intention of an operator being reflected at the time of scrolling the map image. A value $R_V$ corresponding to the square of a distance up to a current position centering on a reference position is operated on the basis of output voltages of potentiometers detecting a tilted position of an operating rod. In a control unit, a scrolling speed and a scale factor of the map image displayed on a display screen of a monitor television are varied in accordance with a signal $U_P$ including information on an amount of displacement of the operating rod from the reference position.

10 Claims, 20 Drawing Sheets

F I G. 1 4
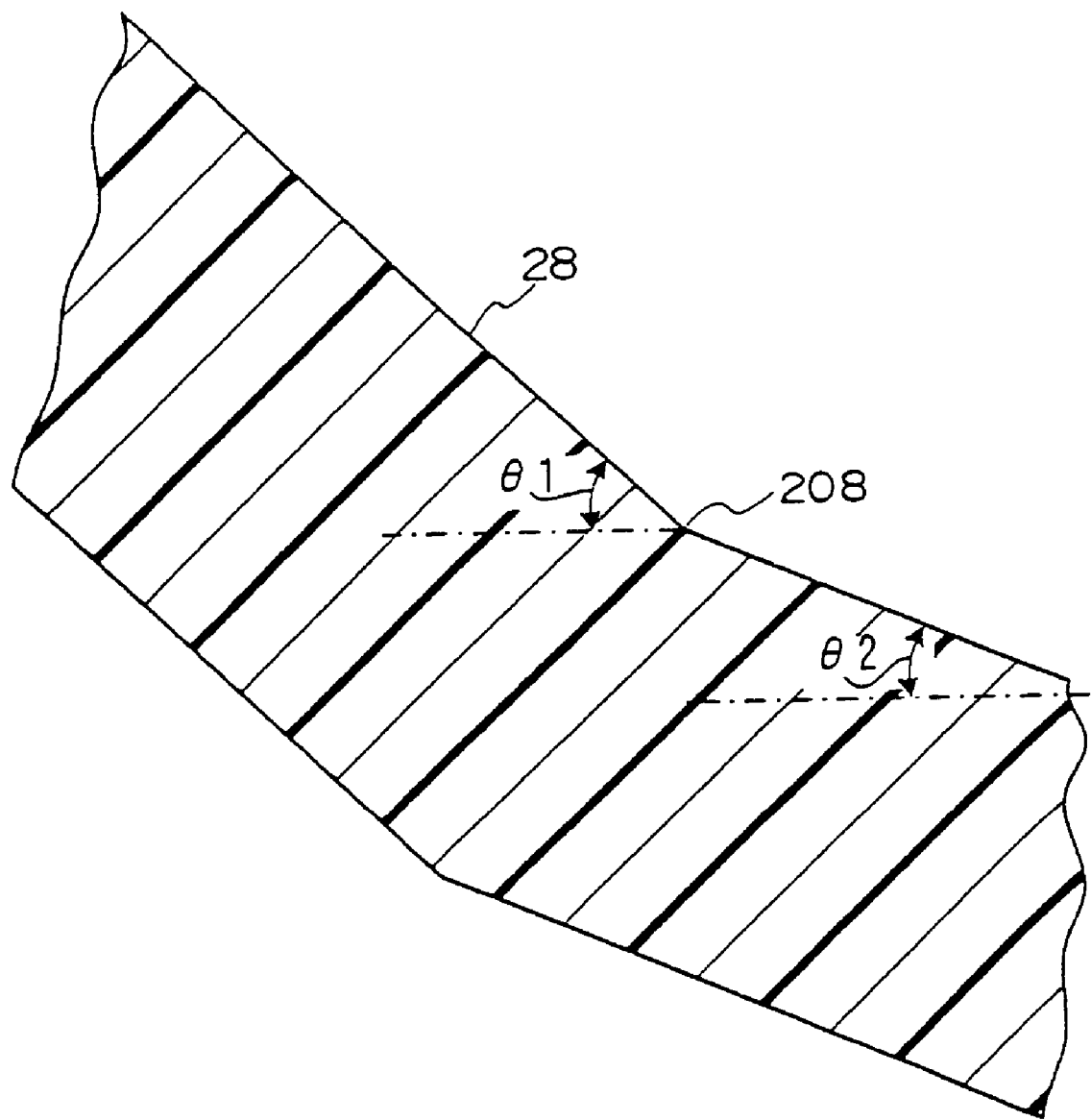

MONITOR DISPLAY CONTROL APPARATUS AND MONITOR DISPLAY CONTROL METHOD

CROSS-REFERENCE TO RELATED APPLICATION

This application claims priority under 35 USC 119 from Japanese Patent Application No. 2003-312942, the disclosure of which is incorporated by reference herein.

BACKGROUND OF THE INVENTION

1. Field of the Invention

The present invention relates to a monitor display control apparatus and a monitor display control method in which a map image is displayed on a display screen of a monitor component such as a car navigation device loaded on a vehicle, or the like.

2. Description of the Related Art

There are automobiles in which a car navigation system is installed. The car navigation system has a monitor component, and a map image or the like can be displayed on a display screen of the monitor component. Further, when a map image is being displayed on the display screen of the monitor component, a cursor is displayed on the center of the display screen. In this case, the map image is made to move (scroll) relatively with respect to the cursor in accordance with input from an operation component.

As such a car navigation system, there is a car navigation system in which a relative moving speed (scrolling speed) of a map image with respect to a cursor can be varied in plural stages in order to rapidly find out a destination or the like.

For example, there is a car navigation system in which a scroll key for scrolling a map image on a display screen is provided, and there is disclosed one example thereof in Japanese Patent Application Laid-Open (JP-A) No. 8-69515. This system is structured such that a scale factor of the map image displayed on the display screen is varied in stages and automatically in predetermined time units while maintaining a scrolling speed to be constant when a time of continuous thrusting the scroll key is increasing.

Moreover, in this system, when a destination has been registered in advance, the scale factor of the map image is varied so as to be approximate to an original scale (maximum enlarged display) as the destination approaches the cursor on the display screen. Namely, when the destination approaches the cursor on the display screen, the map image is displayed to be enlarged in spite of a time of continuous thrusting the scroll key, and the contents of the map image are reported in detail.

However, even when the destination has approached the cursor on the display screen, when the destination has not been registered in advance, the scale factor of the map image is not varied to an original scale (maximum enlarged display), and there are cases in which the map image is displayed in a wide range (displayed to be reduced). In such a case, it is necessary to interrupt thrusting the scroll key once, and to display the destination and the vicinity of the destination to be enlarged due to the scale factor of the map image being returned to the current scale. Namely, scrolling of the map image must be once interrupted in order to obtain the detailed information on the destination and the vicinity of the destination. As a result, an operation in which thrusting of the scroll key is interrupted and the scroll key is thrust again is required, and there is the disadvantage that the operation of the scroll key is made to be troublesome, and the ease of operation of scrolling a background image has been poor.

Further, there is a car navigation system in which, when a joy stick key provided to a remote controller for inputting various indications is tilted relatively from the reference position thereof for a long time, the scrolling speed is accelerated and only the road information highly necessary for a driver is displayed on a display screen of a monitor component, and there is disclosed one example thereof in JP-A No. 8-219803.

However, from the time when the joy stick key is tilted to the time when a predetermined time passes, the scrolling speed of the map image is not accelerated, it is difficult to instantly vary the scrolling speed of the map image (for example, to accelerate the scrolling speed) with an intention of the operator being reflected. Further, because this system is not structured such that a scrolling speed of the map image is limited to an extent in which the contents of the map image can be grasped when the scrolling speed is accelerated, there are cases in which the driver cannot visually recognize the map image when the scrolling speed is made fast. Moreover, because this system has a structure in which the map image cannot be displayed in a wide range (a structure in which the scale factor of the map image is made to be constant), a region which does not include a destination and the vicinity of the destination is made to be on an original scale (is displayed to be enlarged). As a result, there is the disadvantage that, even when the driver wishes to display the map image in a wide range, the system cannot correspond thereto, and the ease of operation of scrolling a background image has been poor.

Moreover, there is a car navigation system in which, when an operation of a shift key of the remote controller is carried out in a state in which an operation of the joy stick provided to the remote controller is continued, a scale factor of the map image displayed on the monitor component is varied only during the time when the operation of the shift key is being carried out, and there is disclosed one example thereof in JP-A No. 2002-81942. In this system, when the operation of the shift key is interrupted, the scale factor of the map image is automatically returned to the scale factor before the operation of the joystick was started. In this way, this system can momentarily vary the scale factor of the map image displayed on the display screen of the monitor component.

However, when an attempt is made to return the display from being in a wide-range display to being on an original scale (enlarged display), the operation of the joystick must be interrupted, i.e., the scrolling of the map image must be once stopped. In this way, in this system, because scrolling of the map image cannot be smoothly carried out, it cannot be necessarily said that the ease of operation of scrolling the map image is excellent.

SUMMARY OF THE INVENTION

The present invention has been achieved in consideration of the above-described problems, and an aim of the invention is to provide a monitor display control apparatus and a monitor display control method in which, at the time of scrolling a map image, the ease of operation of scrolling the map image can be improved with an intention of the operator being reflected.

A first aspect of the invention is to provide a monitor display control apparatus which inputs a screen control signal to a monitor component, and displays a map image at a predetermined scale factor on a display screen of the monitor component and displays a cursor on a center of the display screen, and relatively moves the map image with respect to the cursor, the monitor display control apparatus comprising:

an operation component which can be displaced from a reference position; a position detecting component detecting a position of the operation component; a signal output component outputting an operation signal including information on an amount of displacement of the operation component from the reference position on the basis of a detected result at the position detecting component; and a display control component which sets a relative moving speed of the map image and a scale factor of the map image on the basis of the information on the amount of displacement of the operation component included in the operation signal, and which outputs the screen control signal corresponding to the relative moving speed and the scale factor which have been set.

According to the invention, the map image is displayed at a predetermined scale factor on the display screen of the monitor component, and in accordance thereto, the cursor is displayed on the center of the display screen.

When the operation component is displaced from the reference position, the position of the operation component at this time is detected by the position detecting component. When the position of the operation component is detected by the position detecting component, the signal output component outputs an operation signal including the information on the amount of displacement of the operation component from the reference position on the basis of the detected result at the position detecting component.

When the operation signal is outputted from the signal output component, the operation signal is inputted to the display control component, and the display control component outputs a screen control signal on the basis of the operation signal.

Here, the display control component sets a relative speed (a scrolling speed) of the map image and a scale factor of the map image (including the varied amount of the relative speed and the scale factor, or a ratio of these changes) on the basis of the information on the amount of displacement of the operation component from the reference position which is included in the operation signal at the time of outputting the screen control signal. When the relative speed of the map image and the scale factor of the map image are set, the display control component outputs a screen control signal corresponding to the relative speed of the map image and the scale factor of the map image. As a result, on the display screen of the monitor component, a map image on a scale factor on the basis of the amount of displacement of the operation component from the reference position is displayed, and this map image is made to relatively move (scroll) with respect to the cursor at a scrolling speed on the basis of the amount of displacement of the operation component from the reference position. Accordingly, the operator can obtain a desired scrolling speed of the map image and a desired scale factor of the map image by merely adjusting the amount of displacement of the operation component from the reference position (i.e., the position of the operation component).

As described above, according to the invention, at the time of scrolling a map image, the ease of operation of scrolling the map image can be improved with an intention of the operator being reflected.

The monitor display control apparatus may be structure such that, when the amount of displacement of the operation component is less than a predetermined amount, the display control component varies the relative moving speed of the map image according to the amount of displacement of the operation component and sets the scale factor of the map image to the predetermined scale factor, and when the amount of displacement of the operation component is equal to or greater than the predetermined amount, the display control component sets the relative moving speed of the map image to a speed at the time when the amount of displacement of the operation component reaches the predetermined amount, and varies the scale factor of the map image according to the amount of displacement of the operation component.

In accordance therewith, in the display control component, when the amount of displacement of the operation component from the reference position is less than the predetermined amount, the relative moving speed of the map image is varied according to the information on the amount of displacement from the reference position included in the operation signal. In addition thereto, the scale factor of the map image is set to the predetermined scale factor. Namely, on the display screen of the monitor component, the map image is displayed at the predetermined scale factor, and further, when the operation component is displaced by an amount less than the predetermined amount from the reference position, the relative moving speed of the map image is varied according to the amount of displacement of the operation component from the reference position. Accordingly, provided that the operator adjusts the amount of displacement of the operation component from the reference position within a range in which the amount of displacement of the operation component from the reference position does not reach the predetermined amount, the operator can vary only the scrolling speed in a state in which the scale factor of the map image is maintained to be constant.

On the other hand, when the amount of displacement of the operation component from the reference position is equal to or greater than the predetermined amount, the scale factor of the map image is varied to a scale factor different from the predetermined scale factor according to the information on the amount of displacement from the reference position included in the operation signal. In addition thereto, the relative moving speed of the map image is set to a speed at the time when the amount of displacement of the operation component from the reference position reached the predetermined amount. Namely, on the display screen of the monitor component, the map image is made to relatively move at a scrolling speed which is the same as that at the time when the amount of displacement of the operation component from the reference position became the predetermined amount, and moreover, when the scale factor of the map image is varied according to the amount of displacement of the operation component from the reference position. Accordingly, provided that the operator adjusts the amount of displacement of the operation component from the reference position within a range in which the amount of displacement of the operation component from the reference position is made to be equal to or greater than the predetermined amount, the operator can vary only the scale factor of the map image in a state in which the scrolling speed of the map image is maintained to be constant.

In this way, the operator can select whether the relative moving speed of the map image is varied or the scale factor of the map image is varied according to whether or not the amount of displacement of the operation component from the reference position is made to be less than the predetermined amount. Moreover, in each of a case of a variation in the relative moving speed of the map image and a case of a variation in the scale factor of the map image, the operator can momentarily vary the extent of the variation according to an extent of the amount of displacement of the operation component from the reference position. Accordingly, an intention of the operator can be even further reflected in the operation of scrolling the map image.

A moderation component providing a feeling of moderation to the operation component when the amount of displacement of the operation component reaches the predetermined amount may be further provided in the monitor display control apparatus.

In accordance therewith, when the operation component is displaced and the amount of displacement of the operation component reaches the above-described predetermined amount, the moderation component provides a feeling of moderation to the operation component.

As a result, when such a feeling of moderation is transmitted to the operator, the operator can recognize (confirm) that the operation component has reached a position corresponding to the above-described predetermined amount even without visually recognizing the operation component.

Accordingly, according to the invention, at the time of scrolling a map image, the ease of operation of scrolling the map image can be improved with an intention of the operator being reflected.

A second aspect of the invention is to provide a monitor display control method, in which a screen control signal is input to a monitor component, a map image is displayed at a predetermined scale factor on a display screen of the monitor component, a cursor is displayed on a center of the display screen, and relatively moves the map image with respect to the cursor, the monitor display control method comprising: (a) detecting a position of the operation component which can be displaced from a reference position; (b) outputting an operation signal including information on an amount of displacement of the operation component from the reference position on the basis of the detected position; and (c) setting a relative moving speed of the map image and a scale factor of the map image on the basis of the information on the amount of displacement of the operation component included in the operation signal, and outputting the screen control signal corresponding to the relative moving speed and the scale factor which have been set.

As described above, according to the invention, at the time of scrolling a map image, the ease of operation of scrolling the map image can be improved with an intention of the operator being reflected.

BRIEF DESCRIPTION OF THE DRAWINGS

FIG. 14 is an enlarged view of a moderation portion structuring a moderation component.

DETAILED DESCRIPTION OF THE INVENTION

Figure 1:
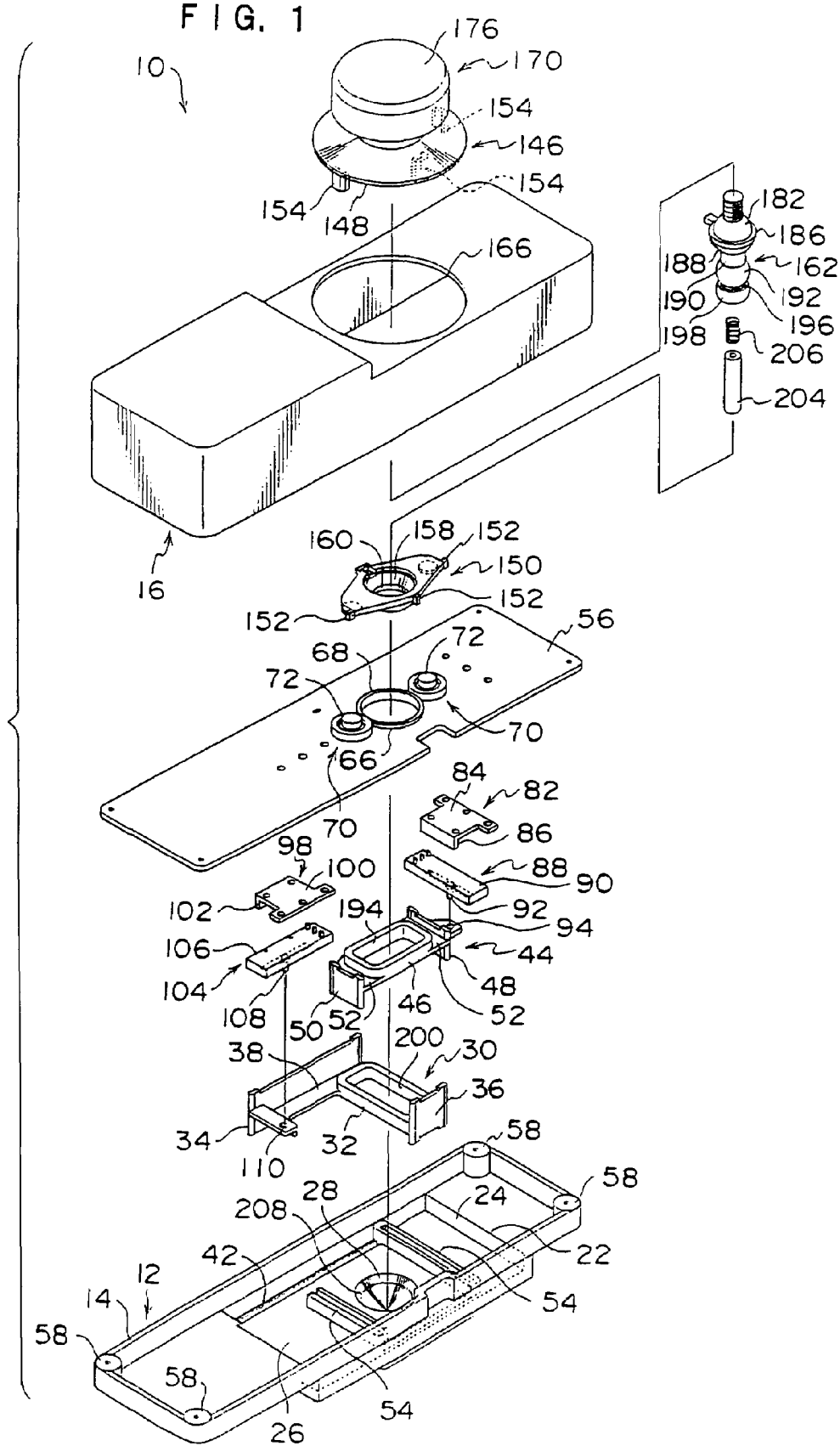
FIG. 1 is an exploded perspective view showing a structure of a monitor display control apparatus relating to an embodiment of the present invention.

In FIG. 1, a structure of a controller 10 structuring a monitor display control apparatus 11 relating to an embodiment of the present invention is shown by an exploded perspective view.

As shown in the drawing, the controller 10 has a base 12. The base 12 is formed in a substantially rectangle as seen in plan view, and a peripheral wall 14 is provided upright from the outer circumferential portion thereof. Accordingly, the base 12 is made to be a shallow bottom box shape, which entirely opens to one side in the direction of the thickness (the upper side of FIG. 1). An upper housing 16 is provided over the base 12.

The upper housing 16 is made to be a substantially rectangle made to have the longish side along the direction of the length of the base 12, and is made to be a substantially box shape opening to the base 12 side as a whole.

Figure 3:
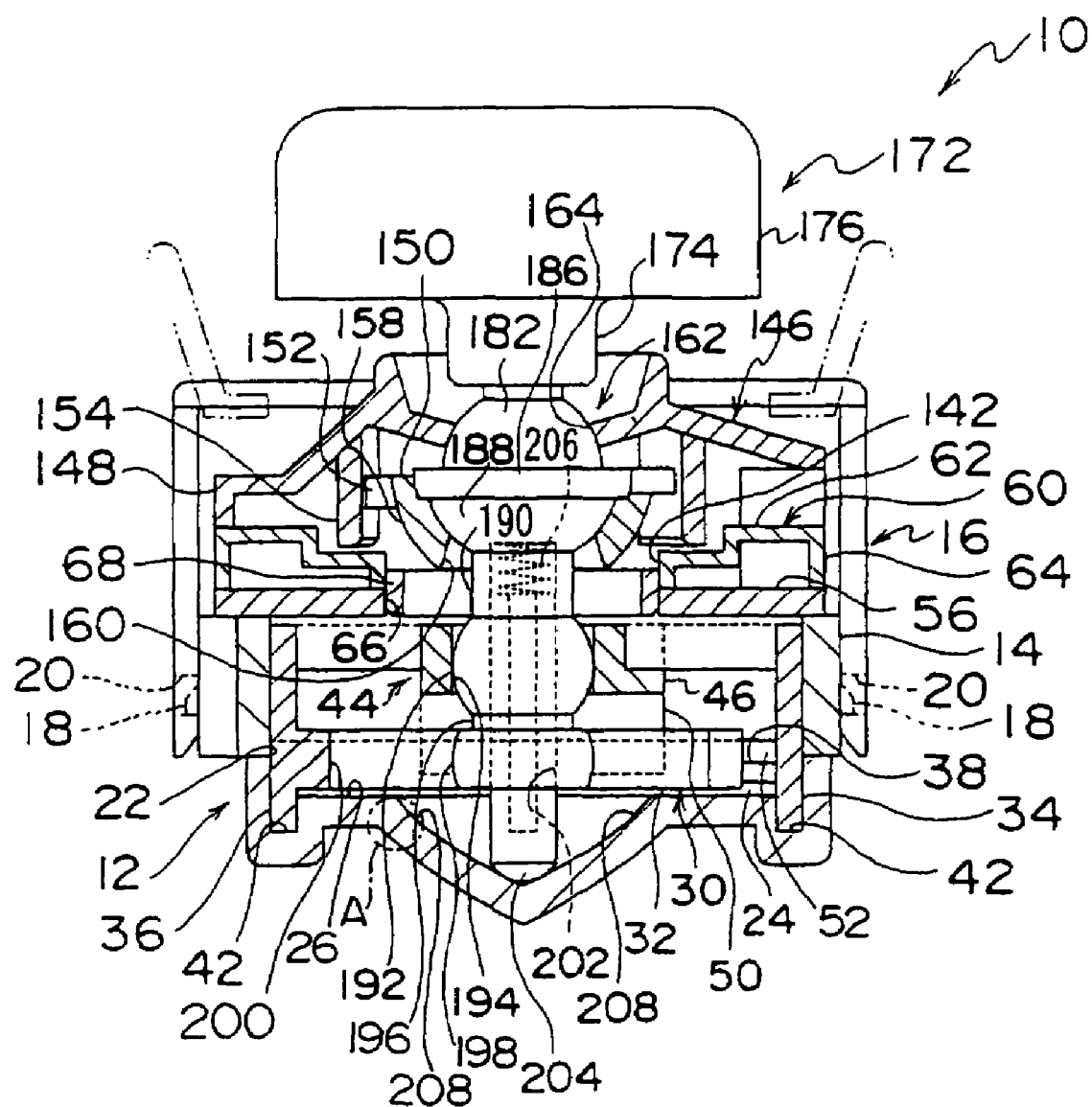
FIG. 3 is a side sectional view showing a structure of the monitor display control apparatus relating to the embodiment of the invention.

As shown in FIG. 3, a plurality of fitting pawls 18 are formed at the peripheral wall 14 of the base 12 so as to project outward, and it is structured such that the base 12 and the upper housing 16 are connected so as to be substantially integrated due to the fitting pawls 18 being fit into fitting holes 20 formed at the upper housing 16 so as to correspond to these fitting pawls 18.

Further, a substantially rectangular opening portion 22 is formed at the intermediate portion in the direction of the length of the base 12. A peripheral wall 24 is formed toward the lower side (i.e., the opposite side of the upper housing 16) from the periphery of the opening portion 22. Moreover, a bottom wall 26 is formed at an end portion at the opposite side of the upper housing 16 of the peripheral wall 24, and the bottom wall 26 closes down the end portion at the opposite side of the upper housing 16 of the peripheral wall 24.

Figure 2:
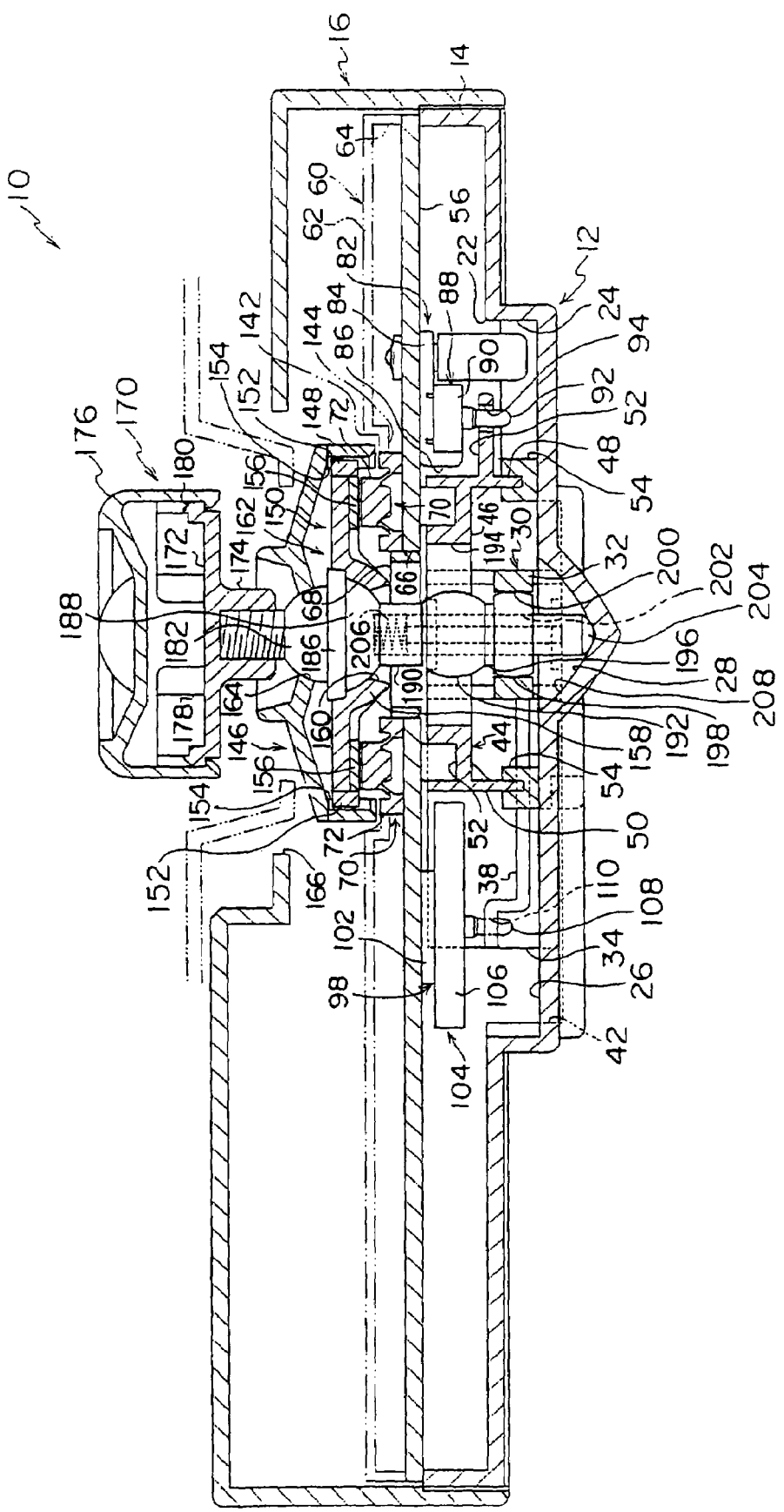
FIG. 2 is a front sectional view showing a structure of the monitor display control apparatus relating to the embodiment of the invention.

Further, a concave portion 28 is formed at the substantially center in the cross direction on the intermediate portion in the direction of the length of the bottom wall 26. As shown in FIG. 2 or the like, the concave portion 28 is made to be a substantially circle as seen in plan view, and is formed in a substantially conical cone-shape as a whole.

On the other hand, as shown in FIG. 1, a slider 30 is provided above the concave portion 28. The slider 30 has a slider body 32. The slider body 32 is formed in a substantially rectangular frame shape along the cross direction of the base 12. A leg plate 34 is provided at one side in the direction of the length of the slider body 32, and a leg plate 36 is provided at the other side in the direction of the length of the slider body 32.

The leg plate 34 is a plate-shaped portion made to have the direction of the thickness along the cross direction of the base 12, and is integrally connected to one end in the direction of the length of the slider body 32 via a connection portion 38 formed at the intermediate portion of the leg plate 34 along the direction of the depth of the base 12. On the other hand, the leg plate 36 as well is a plate-shaped portion made to have the direction of the thickness along the cross direction of the base 12, and is integrally connected to the other end in the direction of the length of the slider body 32.

These leg plates 34 and 36 have come into guide grooves 42 formed along the both ends in the cross direction of the bottom wall 26. Due to the leg plates 34 and 36 which have come into the guide grooves 42 being interfered by the inner walls at the both sides in the cross direction of the guide grooves 42, the displacements of the leg plates 34 and 36 along the cross direction of the base 12 are regulated. In accordance therewith, it is structured such that the slider 30 basically slides in the direction of the length of the base 12.

Further, a slider 44 is provided at the upper side of the slider 30 (i.e., the opposite side of the base 12 via the slider 30). The slider 44 has a slider body 46. The slider body 46 is formed in a substantially rectangular frame shape along the direction of the length of the base 12. A leg plate 48 is provided at one side in the direction of the length of the slider body 46, and a leg plate 50 is provided at the other side in the direction of the length of the slider body 46.

The leg plate 48 is a plate-shaped portion made to have the direction of the thickness along the direction of the length of the base 12, and is connected integrally to one end in the direction of the length of the slider body 46 via a connection portion 52 formed at the intermediate portion of the leg plate 48 along the direction of the depth of the base 12. On the other hand, the leg plate 50 as well is a plate-shaped portion made to have the direction of the thickness along the direction of the length of the base 12, and is connected integrally to the other end in the direction of the length of the slider body 46 via the connection portion 52 formed at the intermediate portion of the leg plate 50 along the direction of the depth of the base 12.

A pair of guides rails 54 are formed on the bottom wall 26 so as to correspond to these leg plates 48 and 50. These guide rails 54 have groove portions ranging along the cross direction of the base 12, and the leg plate 48 has come into the groove portion of the one guide rail 54, and the leg plate 50 has come into the groove portion of the other guide rail 54.

The respective guide rails 54 regulate displacing of the leg plates 48 and 50 along the direction of the length of the base 12 due to the leg plates 48 and 50 being interfered by the inner walls of the groove portions facing each other along the direction of the length of the base 12. In accordance therewith, it is structured such that the slider 44 basically slides in the cross direction of the base 12.

A circuit substrate 56 is disposed at the upper side of the slider 44 (i.e., the opposite side of the slider 30 via the slider 44). The circuit substrate 56 is a substantially rectangular plate shape made to have the direction of the length along the direction of the length of the base 12, and it is structured such that the circuit substrate 56 is fixed on the peripheral wall 14 due to clamping components such as screws or the like which pierce cylindrical bosses 58 formed at the four corners of the base 12 being screwed into the corner portions of the circuit substrate 56. Further, as shown in FIG. 2 and FIG. 3, a cover 60 is provided on the circuit substrate 56. The cover 60 has a tabular raised bottom portion 62. A peripheral wall 64 is formed at the circumferential portion of the raised bottom portion 62, and an end portion (the end portion at an opposite side of the raised bottom portion 62) of the peripheral wall 64 touches the circuit substrate 56. In accordance therewith, the raised bottom portion 62 covers the circuit substrate 56 in a state in which the raised bottom portion 62 does not interfere with a resistor and respective parts such as a capacitor or the like which have been provided on the circuit substrate 56.

Further, as shown in FIG. 1, a circular hole 66 is formed at the substantially center in the cross direction of the circuit substrate 56. A ring member 68 is fitted into the circle hole 66. One end side from the intermediate portion in the cross direction of the ring member 68 projects toward the surface side of the circuit substrate 56. Push switches 70 are disposed on the circuit substrate 56 at the both sides of the ring member 68 along the direction of the length of the base 12.

Figure 6:
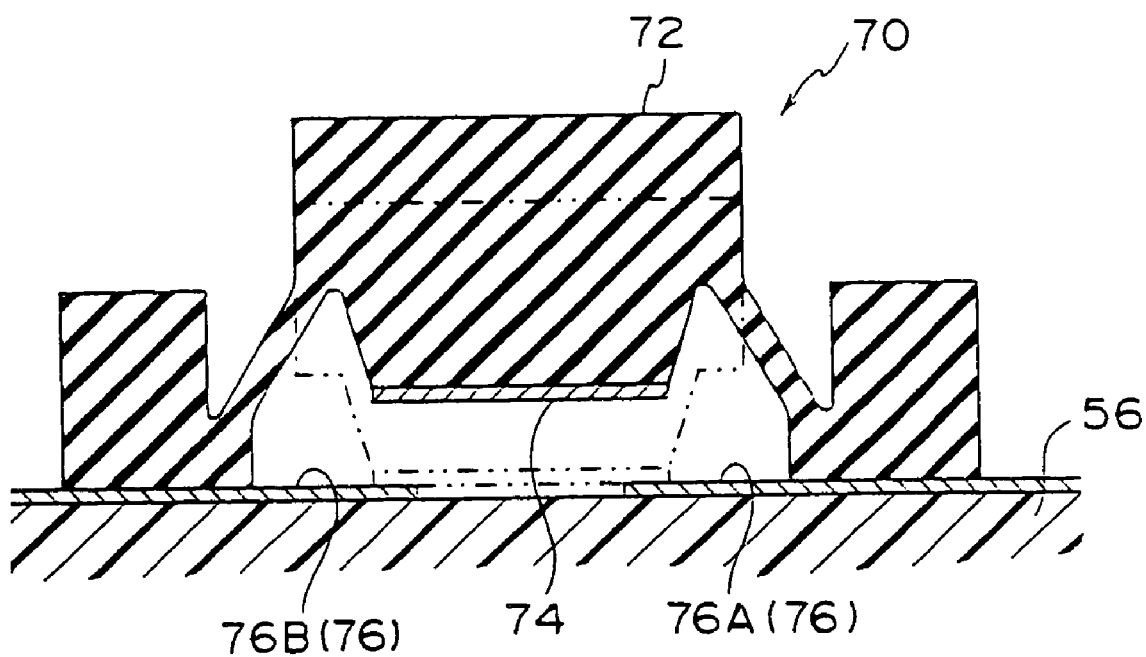
FIG. 6 is an enlarged sectional view of a push switch.

The push switch 70 has a movable part 72. The movable part 72 is formed, in a substantially bowl shape, from a rubber material or a relatively flexible synthetic resin material having a insulation performance, and is attached on the circuit substrate 56 in a state in which the opening side thereof faces the circuit substrate 56 side. As shown in FIG. 6, a moving contact 74 is attached to the inner bottom portion of the movable part 72.

The moving contact 74 is formed from, for example, a metallic foil having conductivity such as copper or the like. A wiring 76 formed on the circuit substrate 56 so as to face the moving contact 74 is disconnected at a portion corresponding to the intermediate portion of the moving contact 74. When the moving contact 74 comes into contact with the circuit substrate 56 due to the movable part 72 being elastically deformed such that the bottom portion of the movable part 72 approaches the circuit substrate 56 with respect to the wiring 76, the moving contact 74 comes into contact with both of a wiring 76A which is one side of the disconnected wiring 76 and a wiring 76B which is the other side of the disconnected wiring 76, and continuity is achieved. In accordance therewith, the wiring 76A and the wiring 76B are made to be conductive via the moving contact 74.

Further, current detecting elements 78 (refer to a schematic block diagram of FIG. 7) are provided on the circuit substrate 56 so as to correspond to these push switches 70. The current detecting element 78 are connected to the wiring 76 corresponding to the push switches 70 described above, when an electric current is made to flow into the wiring 76 due to the wiring 76 being made to be conductive via the moving contact 74, the current detecting element 78 outputs digital electric information $S_p$ at a predetermined level.

On the other hand, as shown in FIG. 1, an adjusting plate 82 is attached to the rear surface of the circuit substrate 56. The adjusting plate 82 has a base portion 84. The base portion 84 is entirely formed in a flat plate shape, and is fixed to the circuit substrate 56 in a state in which one side thereof in the direction of the thickness faces the rear surface of the circuit substrate 56. An adjusting wall 86 is formed so as to be substantially perpendicularly bent to the lower side (the bottom wall 26 side) at one end portion of the base portion 84 along the cross direction of the base 12.

A potentiometer 88 serving as a position detecting component is attached to the surface at the opposite side of the circuit substrate 56 of the base portion 84. The potentiometer 88 has a substantially rectangular parallelepiped body 90 made to have the cross direction along the direction of the length of the base 12, and an electrically resistive member is accommodated inside the body 90.

Further, a slide protrusion 92 protrudes from the surface at the opposite side of the base portion 84 of the body 90. The slide protrusion 92 is made to be freely slidable at a predetermined stroke, and analog electric information $E_Y$ corresponding to an electric potential in accordance with a slid position of the slide protrusion 92 is outputted from the potentiometer 88.

As shown in FIG. 1, the body 90 of the potentiometer 88 is attached to the base portion 84 such that a sliding direction of the slide protrusion 92 goes along the cross direction of the base 12, and the slide protrusion 92 is fitted into an fitting hole 94 formed at the slider 44 described above. Accordingly, due to the slider 44 sliding along the cross direction of the base 12, the slide protrusion 92 slides so as to be substantially integrated with the slider 44. Namely, this potentiometer 88 detects a position of the slider 44 along the cross direction of the base 12.

Further, an A/D converter 96 (refer to a schematic block diagram of FIG. 7) is provided at the above-described circuit substrate 56, and an output terminal of the potentiometer 88 is connected to an input terminal of the A/D converter 96. The signal $E_Y$ outputted from the potentiometer 88 is inputted to the A/D converter 96, and the A/D converter 96 outputs digital electric information $S_Y$ corresponding to the signal level of the inputted signal $E_Y$.

On the other hand, an adjusting plate 98 is attached to the rear surface of the circuit substrate 56. The adjusting plate 98 has a base portion 100. The base portion 100 is entirely formed in a flat plate shape, and is fixed to the circuit substrate 56 in a state in which one side thereof in the direction of the thickness faces the rear surface of the circuit substrate 56.

As shown in FIG. 1, an adjusting wall 102 is formed so as to be substantially perpendicularly bent to the lower side (the bottom wall 26 side) at one end portion of the base portion 100 along the direction of the length of the base 12. A potentiometer 104 serving as a position detecting component is attached to the surface at the opposite side of the circuit substrate 56 of the base portion 100. The potentiometer 104 has a substantially rectangular parallelepiped body 106 made to have the direction of the length along the direction of the length of the base 12, and an electrical resistive member is accommodated inside the body 106.

Further, a slide protrusion 108 protrudes from the surface at the opposite side of the base portion 100 of the body 106. The slide protrusion 108 is made to be freely slidable at a predetermined stroke, and analog electric information $E_X$ corresponding to an electric potential in accordance with a slid position of the slide protrusion 108 is outputted from the potentiometer 104.

Figure 4:
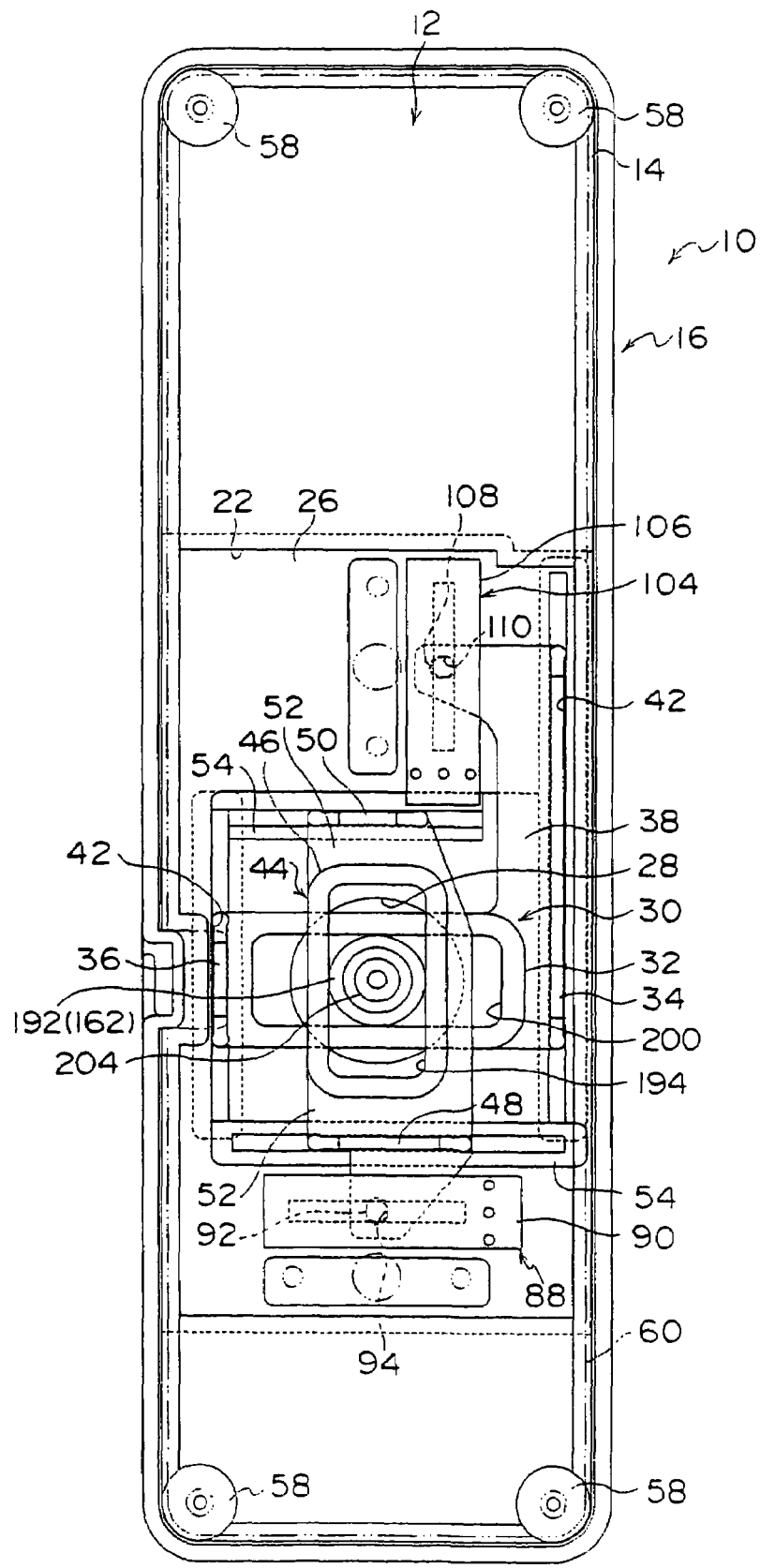
FIG. 4 is a plan sectional view showing a structure of an inside of the monitor display control apparatus relating to the embodiment of the invention.

As shown in FIG. 4, the body 106 of the potentiometer 104 is attached to the base portion 100 such that the sliding direction of the slide protrusion 108 goes along the direction of the length of the base 12, and the slide protrusion 108 is fitted into the fitting hole 110 formed at the connection portion 38 of the slider 30 described above. Accordingly, due to the slider 30 sliding along the direction of the length of the base 12, the slide protrusion 108 slides so as to be substantially integrated with the slider 30. Namely, this potentiometer 104 detects a position of the slider 30 along the direction of the length of the base 12.

Further, an A/D converter 112 (refer to a schematic block diagram of FIG. 7) is provided at the above-described circuit substrate 56, and an output terminal of the potentiometer 104 is connected to an input terminal of the A/D converter 112. The signal $E_X$ outputted from the potentiometer 104 is inputted to the A/D converter 112, and the A/D converter 112 outputs digital electric information $S_X$ corresponding to the signal level of the inputted signal $E_X$.

Figure 7:
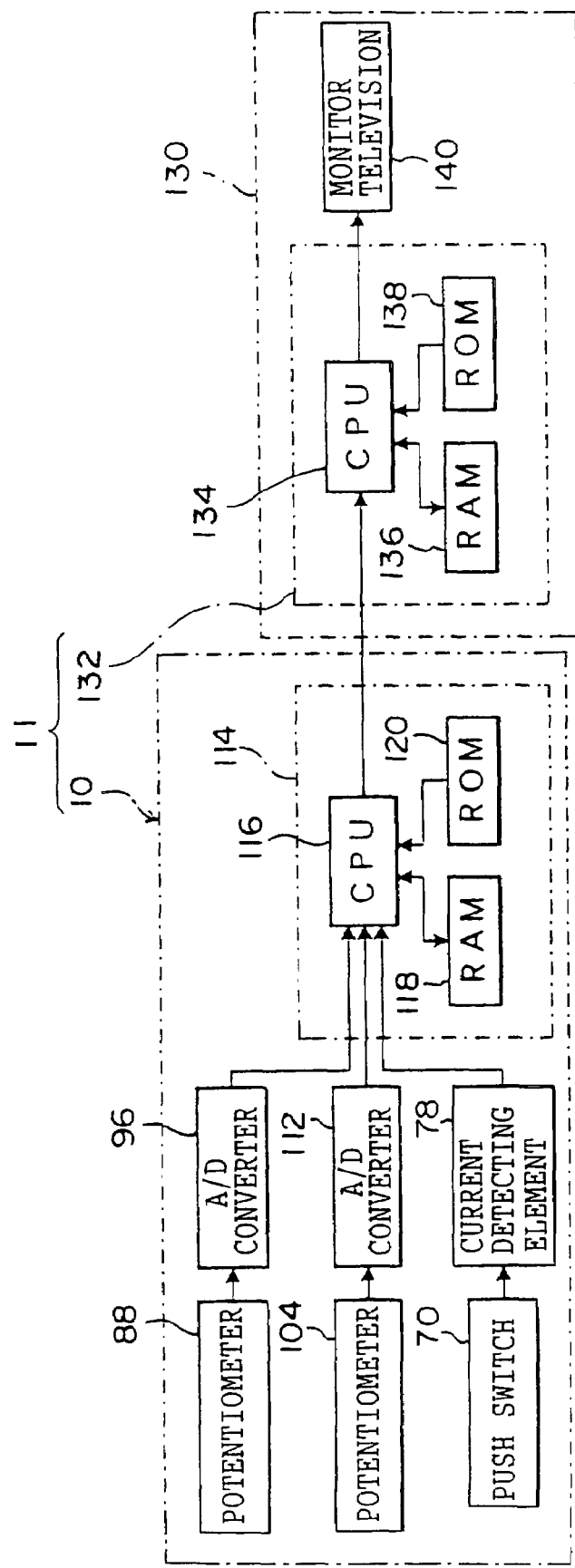
FIG. 7 is a block diagram showing an outline of the monitor display control apparatus relating to the embodiment of the invention.

Further, as shown in FIG. 7, a microcomputer 114 serving as a signal output component structured from a CPU 116, a RAM 118, and a ROM 120 is provided at the circuit substrate 56. The output terminal of the current detecting element 78 and the respective output terminals of the A/D converters 96 and 112 which were described above are connected to an input port of the microcomputer 114, and the signals $S_p$, $S_Y$, $S_X$ outputted from the current detecting element 78 and the A/D converters 96 and 112 are inputted to the CPU 116 of the microcomputer 114. The CPU 116 processes the signals $S_p$, $S_Y$, $S_X$ on the basis of a signal processing program or a judgement processing program which has been read from the ROM 120 and which will be described later, and further outputs a signal $U_P$ (P=0, 1, 2, 3, 4, 5) serving as an operation signal based on the processed results.

Note that, in the present embodiment, it is structured such that the A/D converters 96 and 112 are provided separately from the microcomputer 114. However, it may be structured such that substantial functions of the A/D converters 96 and 112 are applied to the microcomputer 114, and the A/D converters 96 and 112 are structurally omitted.

As shown in FIG. 7, the microcomputer 114 is connected to a control unit 132 serving as a display control component of a car navigation device 130 loaded on a vehicle. The control unit 132 is structured from a CPU 134, a RAM 136, and a ROM 138, or the like. Moreover, the control unit 132 is connected to a monitor television 140 serving as a monitor component loaded on the vehicle, and outputs various signals inputted to the CPU 134, and picture signals (screen control signals) on the basis of a navigation program, a screen control program, or the like which are read from the ROM 138 by the CPU 134. As a result, a predetermined image such as a map image or the like is displayed on the display screen of the monitor television 140.

Here, a scale factor selection button for selecting a scale factor of a map image at the time when an operating rod 162 is not operated (i.e., when the operating rod 162 is positioned at a reference position) is connected to the CPU 134 of the control unit 132. When the above-described scale factor is selected by the scale factor selection button, data corresponding to the scale factor (hereinafter, scale factor data) is stored in the RAM 136 via the CPU 134. Additionally, when the operating rod 162 has been not operated, the CPU 134 reads the scale factor data from the RAM 136, and displays the map image on the monitor television 140 on the scale factor selected by the above-described scale factor selection button.

The controller 10 having the microcomputer 114 as described above structures the monitor display control apparatus 11 along with the control unit 132.

On the other hand, as shown in FIG. 2, a hole 142 is formed so as to correspond to the circular hole 66 formed at the circuit substrate 56 at the raised bottom portion 62 of the cover 60 described above. An extension portion 144 is formed at the rear surface of the raised bottom portion 62 along the periphery of the hole 142. The extension portion 144 bends in a hook shape, and is further extended toward the inner side in the radial of the opening of the hole 142. Because a basic terminal side of the extension portion 144 is made to bend in a hook shape as described above, a portion at the inner side in the radial of the opening of the hole 142 is positioned at the circuit substrate 56 side from the raised bottom portion 62 of the cover 60.

Moreover, a bearing plate 146 is disposed at the opposite side of the circuit substrate 56 via the extension portion 144. The bearing plate 146 is made to be entirely a bowl shape with an eminence (additionally speaking, a shape in which a bowl with an eminence is turned upside down), and is made to be a substantially circle as seen in plan view. A ring-shaped peripheral wall 148 is formed along the circumferential portion of the body portion of the bearing plate 146. The peripheral wall 148 pierces the hole 142 of the cover 60 described above, and further, the end portion thereof faces the extension portion 144 formed at the periphery of the hole 142.

Figure 5:
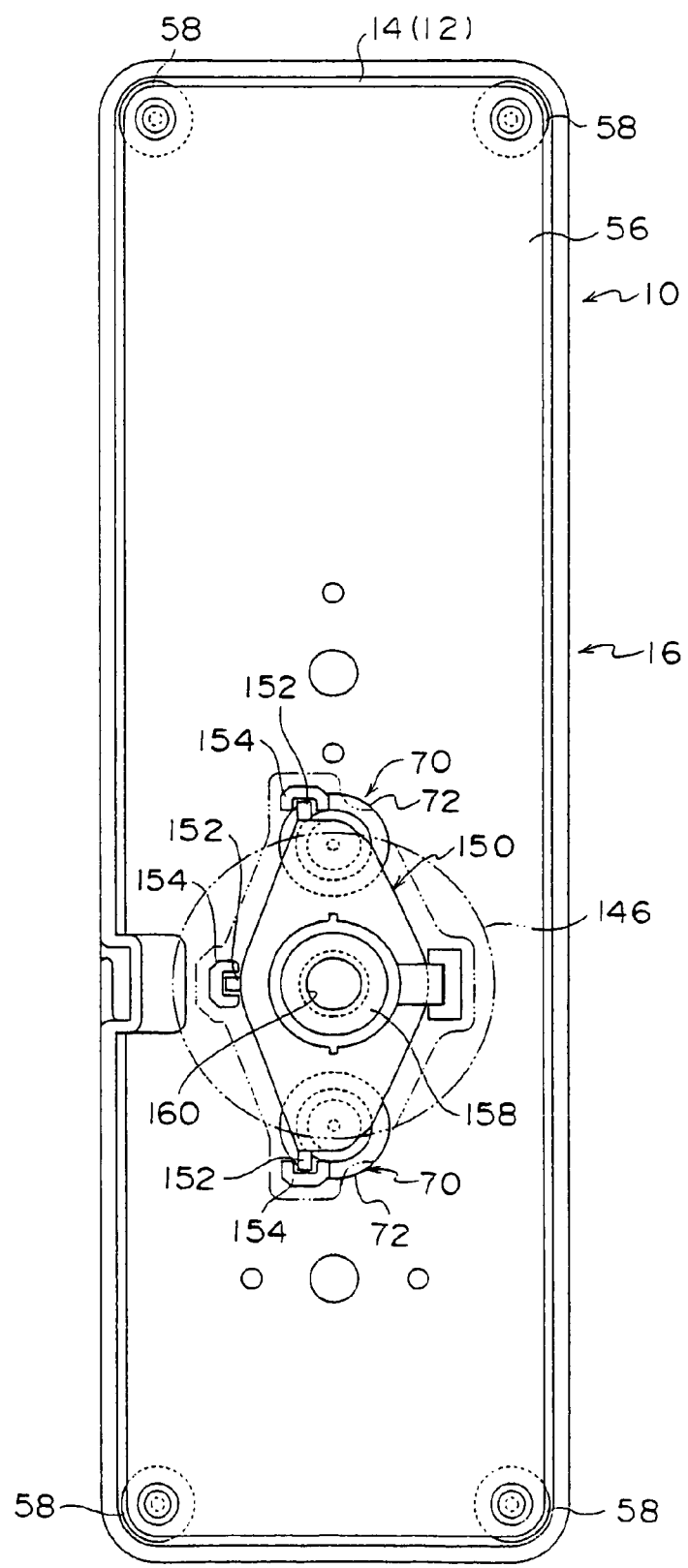
FIG. 5 is a plan sectional view at a position different from that of FIG. 4.

A pressing plate 150 is accommodated inside the peripheral wall 148. As shown in FIG. 5, a plurality of (three in the present embodiment) engaging pieces 152 are formed so as to project at the outer circumferential portion of the pressing plate 150. Guide pieces 154 are formed at the inner circumferential portion of the peripheral wall 148 of the bearing plate 146 so as to correspond to these engaging pieces 152. The guide pieces 154 regulate the displacing direction of the engaging pieces 152 to the direction of the depth (the vertical direction in FIG. 2) of the bearing plate 146 in a state in which the engaging pieces 152 are fitted into the guide pieces 154.

Further, pressing pieces 156 (refer to FIG. 2) are provided at the both end sides of the rear surface of the pressing plate 150 along the direction of the length of the base 12. These pressing pieces 156 face the movable parts 72 of the push switches 70 described above, and it is structured such that the respective pressing pieces 156 thrust the corresponding movable parts 72 due to the pressing plate 150 going down, and the movable parts 72 are elastically deformed.

Moreover, a semi-spherical portion 158 curving so as to be a substantially semi-spherical shape so as to project to the lower side (the circuit substrate 56 side) is formed at the substantially central portion of the pressing plate 150 along the direction of the length of the base 12. A circular hole 160 is formed at a bottom portion of the semi-spherical portion 158.

On the other hand, as shown in FIG. 1, the operating rod 162 serving as an operation component is provided in the base 12 closed by the upper housing 16. The operating rod 162 is disposed in a state of piercing the circular hole 66 formed at the circuit substrate 56, the hole 142 formed at the cover 60 (refer to FIG. 2 and FIG. 3), and the circular hole 160 formed at the pressing plate 150, and in a state of further piercing a bearing hole 164 formed at the substantially center of the bearing plate 146 (refer to FIG. 2 and FIG. 3). Moreover, the top end side of the operating rod 162 is extended to the outside of the upper housing 16 so as to pass through the circular hole 166 formed at the raised bottom of the upper housing 16. Further, an operating knob 170 is attached to the top end of the operating rod 162.

As shown in FIG. 2, the operating knob 170 has a base portion 172. A body portion of the base portion 172 is formed in a substantially disk shape, and a cylindrical boss 174 is formed so as to be substantially coaxially integrated with the body portion at the substantially center of the rear surface of the body portion. A female screw is formed at the inner circumferential portion of the boss 174, and due to a male screw formed at the top end of the operating rod 162 being screwed into the female screw, and the base portion 172 and the operating rod 162 are mechanically integrally connected.

On the other hand, a knob portion 176 is attached to the base portion 172 from an opposite side of the side at which the boss 174 of the base 172 is formed. The knob portion 176 is formed in a bottomed cylindrical shape, which opens to the lower side. The inner diameter dimension of the knob portion 176 is made to be an extent slightly greater than the outer diameter dimension of the base portion 172, and the base portion 172 can be substantially coaxially fitted into the inside of the knob portion 176 with respect to the knob portion 176. Further, a butting rib 178 is formed at the substantially center of the inner bottom portion of the knob portion 176.

The butting rib 178 ensures a mechanical strength of the knob portion 176, and touches the base portion 172 in a state in which the base portion 172 is fitted into the inside of the knob portion 176 as described above, and in accordance therewith, the butting rib 178 regulates the base portion 172 further coming into the inside of the knob portion 176.

On the other hand, engaging pawls 180 are formed at the opening end of the knob portion 176 so as to project inward in the radial of the opening. The fitting pawls 18 are formed in a hook shape so as to project outward in the direction of the radius of the base portion 172 at the outer circumferential portion of the body portion of the base portion 172 so as to correspond to the engaging pawls 180. In a state in which the base portion 172 is touching the above-described butting rib 178, the engaging pawls 180 interfere with the fitting pawls 18 along the direction in which the base portion 172 is pulled out of the knob portion 176. In accordance therewith, the base portion 172 is prevented from being pulled out of the knob portion 176, and the knob portion 176 and the base portion 172 are integrally connected to one another.

Figure 8:
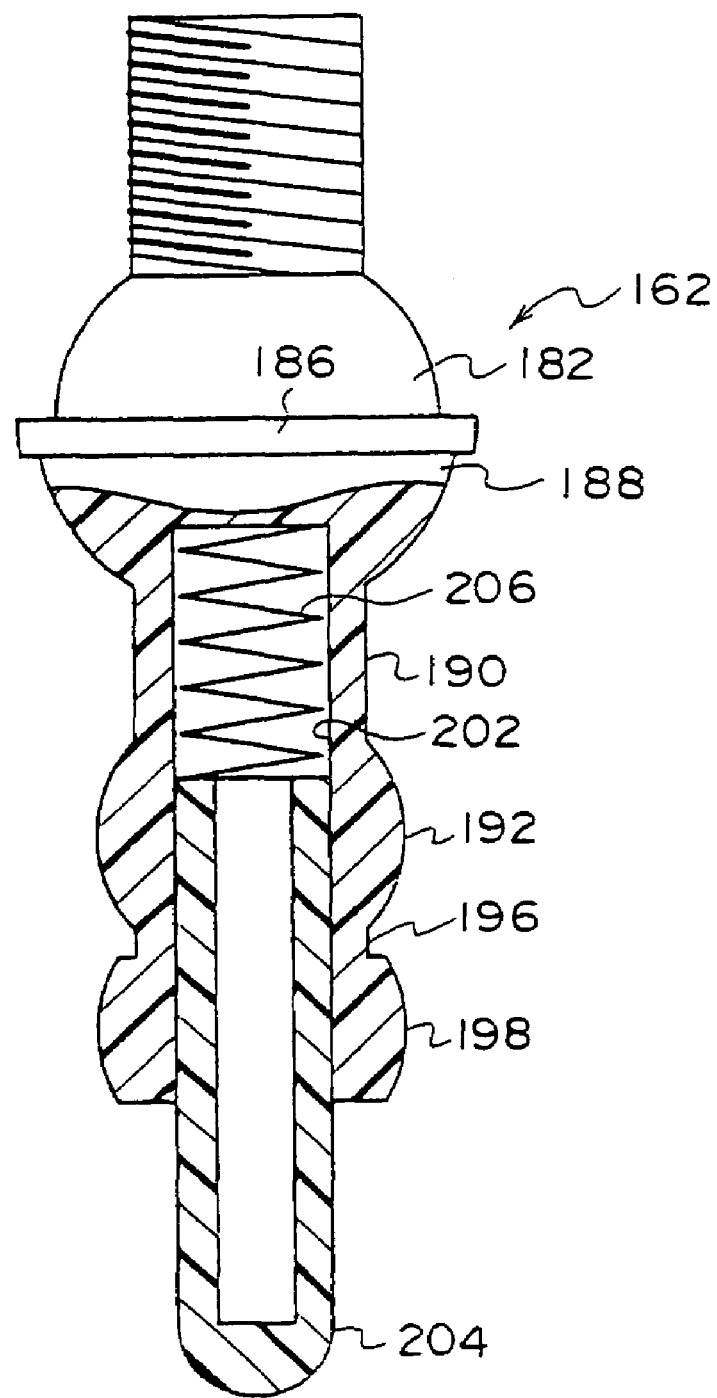
FIG. 8 is a sectional view of an operation component.

Further, as shown in FIG. 8, the side lower than the male screw portion of the operating rod 162 is made to be an axial portion 182. The surface of the axial portion 182 is formed in a substantially semi-spherical shape curving so as to project toward the top end side of the operating rod 162, and the maximum outer diameter dimension is sufficiently greater than the maximum inner diameter dimension of the bearing hole 164 of the bearing plate 146 described above. The axial portion 182 is fitted into the bearing hole 164 from the inside of the bearing plate 146, and is structure so as to be able to rotate by a predetermined angle in every angle with the axial portion 182 itself being an axis with respect to the bearing plate 146 in this state.

Moreover, a flange portion 186 is formed at the lower side of the axial portion 182. The flange portion 186 is a ring shape whose outer diameter dimension is sufficiently greater than the outer diameter dimension of the axial portion 182, and is coaxially formed with respect to the male screw portion of the operating rod 162 and the axial portion 182 along the axial direction of the operating rod 162. The semi-spherical portion 188 is formed at the lower side of the flange portion 186.

The semi-spherical portion 188 is formed in a substantially semi-pherical shape in which the surface curves so as to project toward the lower side of the operating rod 162, and moreover, a radius of curvature of the surface is greater than a radius of curvature of the surface of the axial portion 182, and is less than the radial dimension of the extension portion 144. The semi-pherical portion 188 as well is coaxially formed with respect to the male screw portion and the axial portion 182 of the operating rod 162 in the same way as the flange portion 186, and is fitted into the semi-pherical portion 158 of the pressing plate 150 described above from the top side.

A cylindrical neck portion 190 is coaxially formed at the lower side of the semi-spherical portion 188, and moreover, a trunk portion 192 is formed at the lower side of the neck portion 190. The trunk portion 192 is formed in a substantially cylindrical shape whose outer diameter dimension is greater than that of the neck portion 190. However, the outer circumferential portion of the trunk portion 192 curves so as to project outward with respect to the shaft axis of the operating rod 162, and is basically made to be a shape in which the both sides of the sphere along the axial direction of the operating rod 162 are cut.

Figure 9:
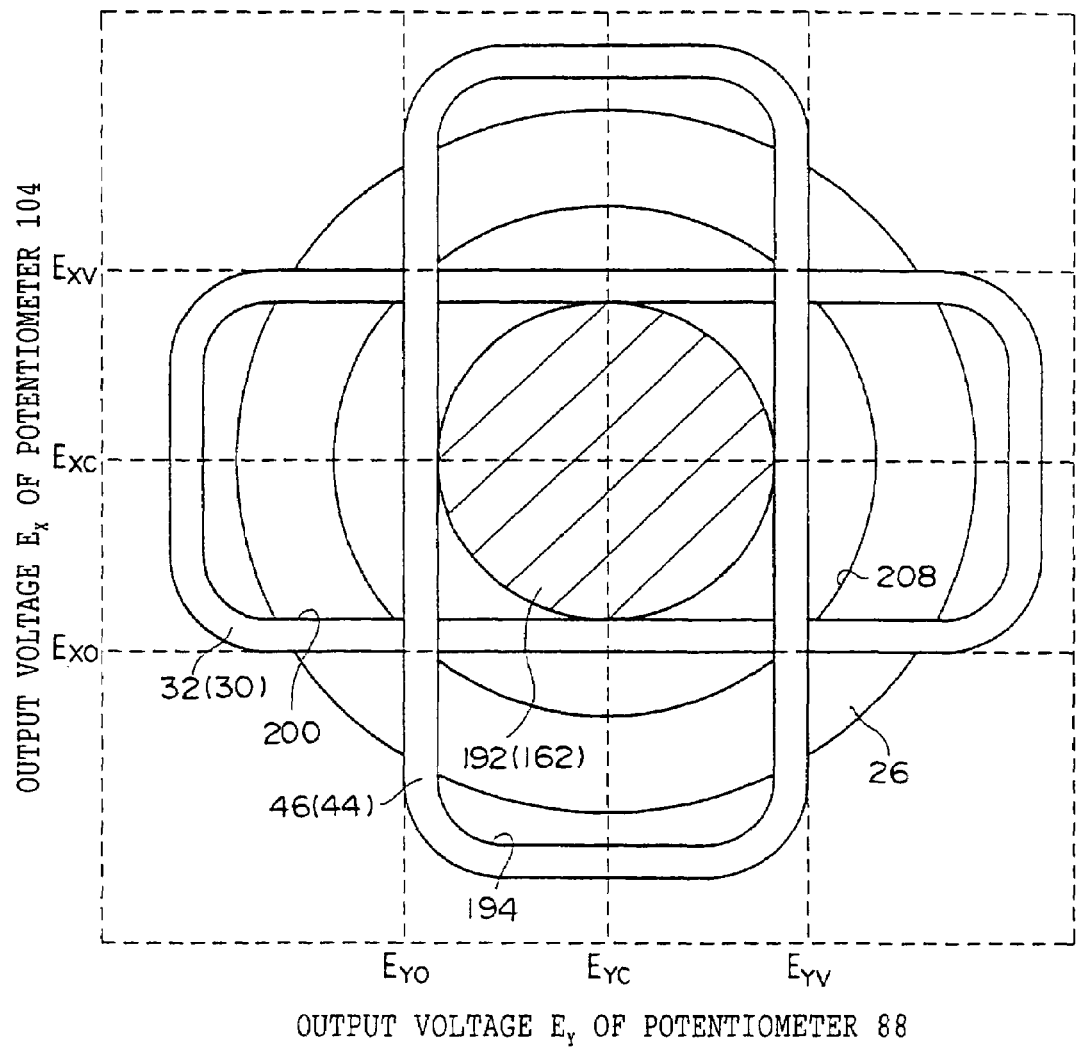
FIG. 9 is a diagram showing positions of sliders and output signals from a position detecting component in a state in which the operation component is at a reference position.
Figure 12:
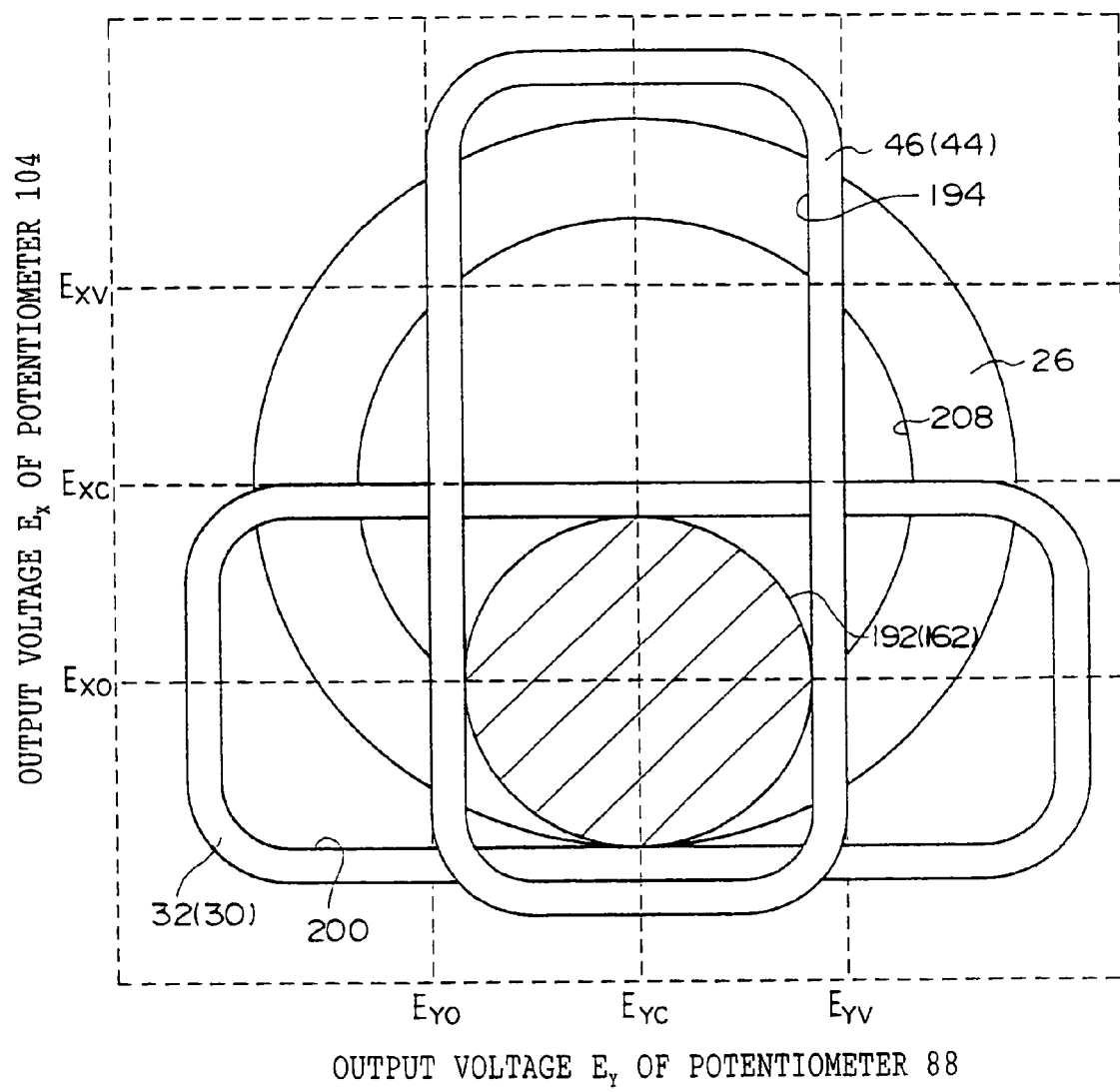
FIG. 12 is a diagram showing positions of the sliders and the output signals from the position detecting component in a state in which the operation component has been moved from the reference position.
Figure 13:
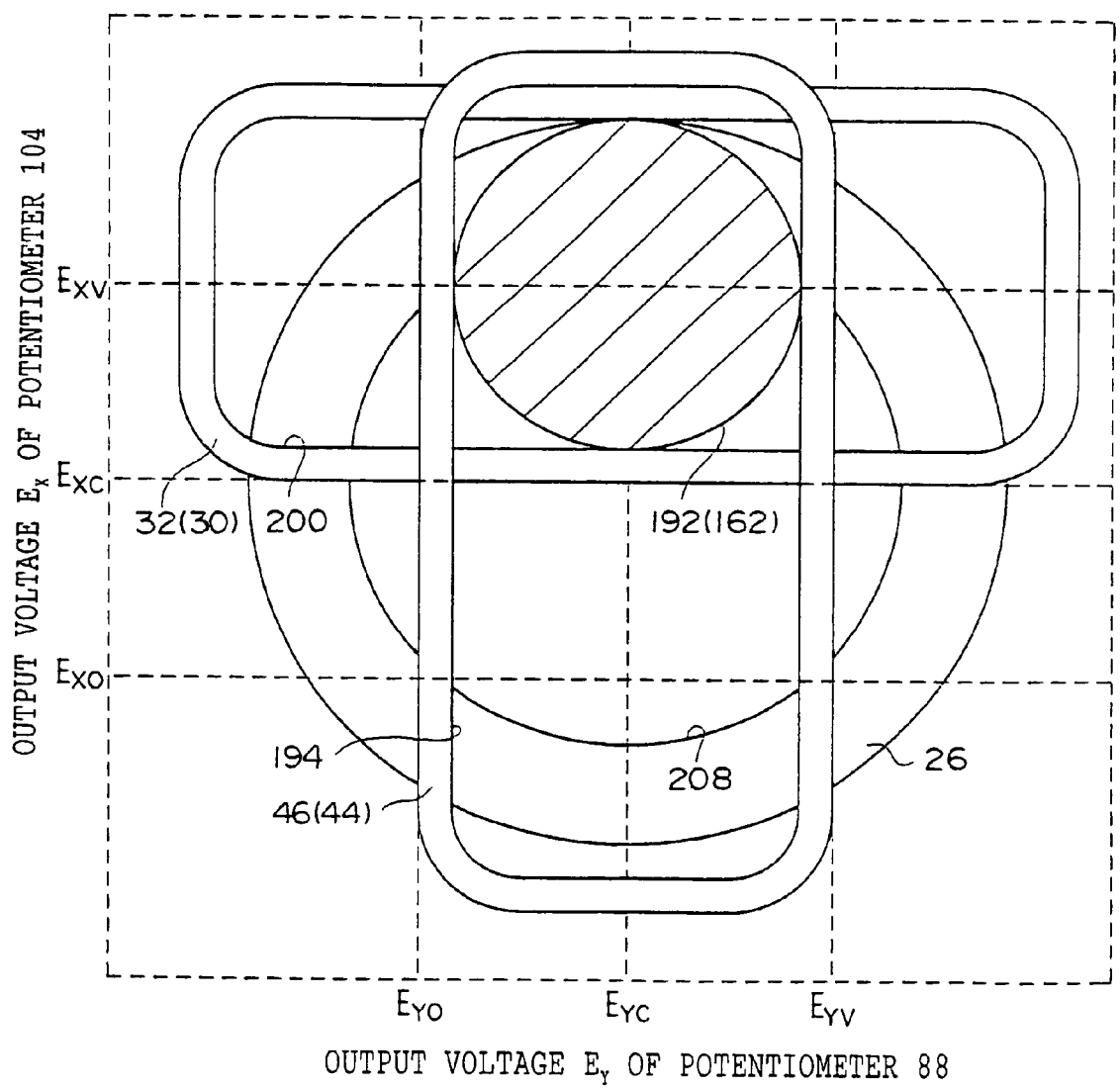
FIG. 13 is a diagram showing positions of the sliders and the output signals from the position detecting component in a state in which the operation component has been moved from the reference position.

The trunk portion 192 comes into a guide hole 194 which is the inner side of the slider body 46 (the slider 44). The guide hole 194 is formed in a substantially rectangle made to have the longish side along the direction of the length of the base 12, and the inner dimension along the cross direction is extremely slightly greater than the outer diameter dimension of the trunk portion 192. Accordingly, the trunk portion 192 can be moved at the inside of the guide hole 194 in the direction of the length of the slider body 46, i.e., the direction of the length of the slider body 46. However, when an attempt is made to move the trunk portion 192 in the cross direction of the guide hole 194, due to the inner circumferential portion of the guide hole 194 being thrust in the cross direction of the guide hole 194, and the trunk portion 192 moves along with the slider body 46 (refer to FIG. 9, FIG. 12, and FIG. 13).

Further, a cylindrical neck portion 196 whose outer diameter dimension is less than that of the trunk portion 192 is formed at the lower side of the trunk portion 192, and moreover, a trunk portion 198 is formed at the lower side of the neck portion 196. The trunk portion 198 is formed in a substantially cylindrical shape whose outer diameter dimension is greater than that of the neck portion 196. However, the outer circumferential portion of the trunk portion 198 curves so as to project outward with respect to the shaft axis of the operating rod 162, and is basically made to be a shape in which the both sides of the sphere along the axial direction of the operating rod 162 are cut.

Figure 10:
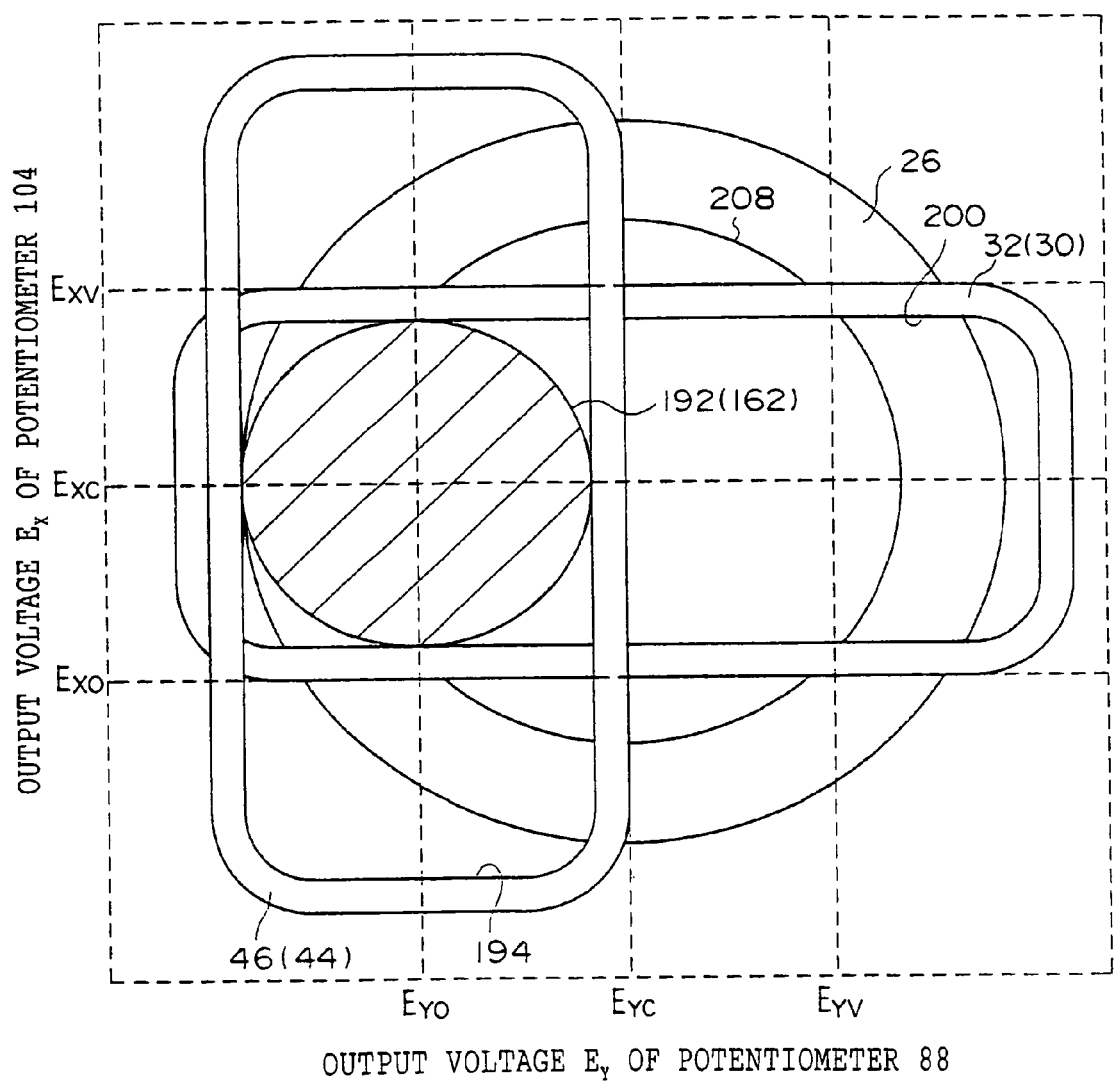
FIG. 10 is a diagram showing positions of the sliders and the output signals from the position detecting component in a state in which the operation component has been moved from the reference position.
Figure 11:
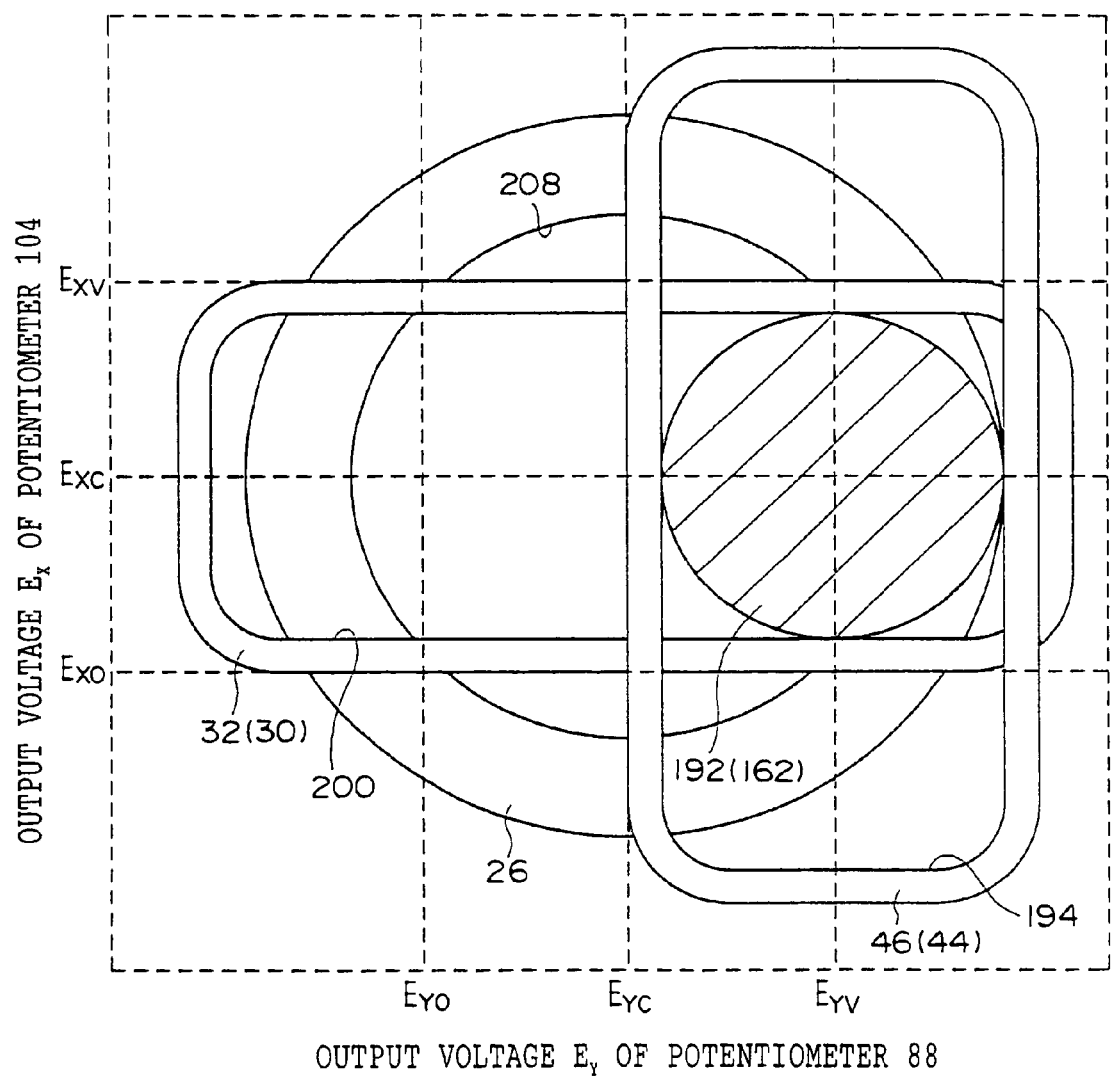
FIG. 11 is a diagram showing positions of the sliders and the output signals from the position detecting component in a state in which the operation component has been moved from the reference position.

The trunk portion 198 comes into a guide 200 which is the inner side of the slider body 32 (the slider 30). The guide 200 is formed in a substantially rectangle made to have the longish side along the cross direction of the base 12, and the inner dimension along the cross direction is extremely slightly greater than the outer diameter dimension of the trunk portion 198. Accordingly, the trunk portion 198 can be moved at the inside of the guide 200 in the direction of the length of the guide 200, i.e., the direction of the length of the slider body 32. However, when an attempt is made to move the trunk portion 198 in the cross direction of the guide 200, due to the inner circumferential portion of the guide 200 being thrust in the cross direction of the guide 200, the trunk portion 198 moves along with the slider body 32 (refer to FIG. 9 through FIG. 11).

On the other hand, as shown in FIG. 8, a bottomed housing hole 202 which opens at the bottom end (i.e., the side of the trunk portion 198) is coaxially formed with respect to the operating rod 162 at the operating rod 162. A moderation pin 204 structuring a moderation component comes into the housing hole 202.

The moderation pin 204 is formed in a bottomed cylindrical shape whose outer diameter dimension is extremely slightly less than the inner diameter dimension of the housing hole 202, and the outer bottom surface which is the tip thereof is made in a substantially semi-spherical shape projecting outward. Further, a compression coil spring 206 is disposed between the inner bottom of the housing hole 202 and the opening end of the moderation pin 204.

One end of the compression coil spring 206 touches the inner bottom of the housing hole 202 and the other end thereof touches the opening end of the moderation pin 204, and the compression coil spring 206 energizes the moderation pin 204 in the direction to which the moderation pin 204 is made to project.

The tip side of the moderation pin 204 comes into contact by thrust with the concave portion 28 of the bottom wall 26 described above by the energizing force of the compression coil spring 206. Here, the center of the radius of curvature at the inner circumferential surface of the concave portion 28 is positioned below the center of the above-described axial portion 182. Accordingly, when the operating rod 162 rotates around the axial portion 182 and the tip of the moderation pin 204 is displaced to the side of the opening of the concave portion 28, the moderation pin 204 comes into the housing hole 202 against the energizing force of the compression coil spring 206.

With respect to the energizing force of the compression coil spring 206, the deeper the moderation pin 204 comes into the housing hole 202, the higher the energizing force increases. Accordingly, the energizing force of the compression coil spring 206 displaces the moderation pin 204 in a rotating state to the center of the bottom portion of the concave portion 28 as a result of pressing the moderation pin 204 which has come into the housing hole 202 out.

Moreover, as shown in FIG. 14 in which the portion of a circle A by the chain double-dashed line in FIG. 3 is enlarged, a moderation portion 208 structuring the moderation component is provided at the intermediate portion between the opening side of the bottom portion of the above-described concave portion 28. The moderation portion 208 is formed in a circle concentric with the concave portion 28 as seen in plan view.

An angle of inclination $\eta 1$ of the concave portion 28 at the side of the opening of the concave portion 28 from the moderation portion 208 is greater than an angle of inclination $\theta 2$ at the side of the bottom of the concave portion 28 from the moderation portion 208. Because the tip of the moderation pin 204 is a substantially semi-spherical shape as described above, when the moderation pin 204 is moved from the side lower than the moderation portion 208 to the side upper than the moderation portion 208 with the moderation portion 208 being as a boundary, and reaches the vicinity of the moderation portion 208, not only the moderation pin 204 comes into point-contact with the side lower than the moderation portion 208, but also the concave portion 28 comes into contact with the moderation pin 204 at the side upper than the moderation portion 208.

In the state in which the moderation pin 204 has come into contact with the both sides with the moderation portion 208 being as a boundary, a resistance in which the moderation pin 204 receives from the concave portion 28 at the time of further moving the moderation pin 204 to the upper side of the concave portion 28 is made high. Moreover, because the angle of inclination of the concave portion 28 is made large at the side upper than the moderation portion 208, the moderation pin 204 attempts to further deeply come into the inside of the housing hole 202. In accordance therewith, the energizing force of the compression coil spring 206 is rapidly increased, and a resistance at the time of rotating the operating rod 162 is made high.

The controller 10 having the above-described structure is provided, for example, at the front of a console box provided between a driver's seat and a passenger seat of a vehicle, or the like, and when the driver's seat is at the relatively right side of the vehicle, the controller 10 is disposed such that a driver on the driver's seat can operate the knob portion 176 by his/her left hand.

Next, the operation and the effect of the present embodiment will be described.

(Operations of the Controller 10)

In the controller 10, when the knob portion 176 of the operating knob 170 is thrust in the substantially front and rear directions of the vehicle, the substantially left and right directions of the vehicle, and further, the directions inclined in the substantially left and right directions of the vehicle with respect to the substantially front and rear directions of the vehicle, the operating rod 162 rotates centering on the axial portion 182, and the operating rod 162 and the operating knob 170 tilt. In this way, when the operating rod 162 rotates centering on the axial portion 182, the side lower than the axial portion 182 tilts in the opposite direction of the tilting direction of the operating knob 170.

When the portion at the side lower than the axial portion 182 of the operating rod 162 tilts centering on the axial portion 182, the inner circumferential portion of the guide 194 of the slider body 46 is thrust in the tilting direction of the trunk portion 192 by the trunk portion 192 of the operating rod 162, and the inner circumferential portion of the guide hole 200 of the slider body 32 is thrust in the tilting direction of the trunk portion 198 by the trunk portion 198 of the operating rod 162.

However, the moving direction of the slider 44 is regulated in the cross direction of the base 12 due to the leg plates 48 and 50 being interfered by the pair of guide rails 54. Therefore, for example, when the trunk portion 192 tilts in the direction tilted with respected to the cross direction of the base 12, the slider 44 slides by an amount of displacement along the cross direction of the base 12 with respect to the tilting direction, and in the direction of the length of the base 12, the trunk portion 192 is merely displaced inside the guide 194.

In contrast thereto, when the portion at the side lower than the axial portion 182 of the operating rod 162 tilts centering on the axial portion 182, the inner circumferential portion of the guide hole 200 of the slider body 32 is thrust in the tilting direction of the trunk portion 198 by the trunk portion 198 of the operating rod 162, and the inner circumferential portion of the guide hole 200 of the slider body 32 is thrust in the tilting direction of the trunk portion 198 by the trunk portion 198 of the operating rod 162.

However, the moving direction of the slider 30 is regulated in the direction of the length of the base 12 due to the leg plates 34 and 36 being interfered by the inner walls of guide grooves 42. Therefore, for example, when the trunk portion 198 tilts in the direction tilted with respected to the direction of the length of the base 12, the slider 30 slides by an amount of displacement along the direction of the length of the base 12 with respect to the tilting direction, and in the cross direction of the base 12, the trunk portion 198 is merely displaced inside the guide hole 200.

In this way, when the operating rod 162 tilts, the slider 44 slides in the cross direction of the base 12 and the slider 30 slides in the direction of the length of the base 12 by an amount corresponding to the tilted angle.

As described above, when the slider 44 slides in the cross direction of the base 12, the slide protrusion 92 fitted into the fitting hole 94 of the slider body 46 slides so as to be substantially integrated with the slider 44. When the slide protrusion 92 slides in the cross direction of the base 12, a value of electrical resistance in the body 90 of the potentiometer 88 varies in accordance with the slid amount (amount of displacement).

a variation in the value of electrical resistance, i.e., an analog voltage (electric information) $E_Y$ corresponding to a position of the slider 44 is outputted from the potentiometer 88. The signal $E_Y$ outputted from the potentiometer 88 is inputted to the A/D converter 96. A digital electric information $S_Y$ corresponding to a signal level (a value of voltage) of the inputted signal $E_Y$ is outputted at predetermined time intervals from the A/D converter 96. The signal $S_Y$ outputted from the A/D converter 96 is inputted to the CPU 116 of the microcomputer 114, and is supplied for respective processings which will be described later.

In contrast thereto, when the slider 30 slides in the direction of the length of the base 12, the slide protrusion 108 fitted into the fitting hole 110 of the connection portion 38 slides so as to be substantially integrated with the slider 30. When the slide protrusion 108 slides in the direction of the length of the base 12, a value of electrical resistance in the body 106 of the potentiometer 104 varies in accordance with the slid amount (amount of displacement).

A variation in the value of electrical resistance, i.e., an analog voltage (electric information) $E_X$ corresponding to a position of the slider 30 is outputted from the potentiometer 104. The signal $E_X$ outputted from the potentiometer 104 is inputted to the A/D converter 112. A digital electric information $S_X$ corresponding to a signal level (a value of voltage) of the inputted signal $E_X$ is outputted at predetermined time intervals from the A/D converter 112. The signal $S_X$ outputted from the A/D converter 112 is inputted to the CPU 116 of the microcomputer 114, and is supplied for respective processings which will be described later.

Note that, in the present embodiment, it is structured such that the signals $S_Y$ and $S_X$ are outputted at predetermined time intervals from the A/D converters 96 and 112. However, it may be structured such that the A/D converters 96 and 112 read the signals $E_Y$ and $E_X$ at predetermined time intervals, and the signals $S_Y$ and $S_X$ are outputted only in the case in which changes arise in the signals $E_Y$ and $E_X$.

On the other hand, as described above, when the operating rod 162 is made to tilt, the moderation pin 204 slides on the concave portion 28. Here, as described above, because the center of curvature at the inner circumferential surface of the concave portion 28 is positioned to be lower than the axial portion 182 which is the center of rotation (tilting) of the operating rod 162, when the operating rod 162 is tilted and the moderation pin 204 is displaced to the side of the opening end (i.e., the upper side) of the concave portion 28, a distance from the center of rotation of the operating rod 162 to the contact position between the tip of the moderation pin 204 and the concave portion 28 is made to be short.

In accordance therewith, when the operating rod 162 tilts, the moderation pin 204 is displaced to the inside of the housing hole 202 against the energizing force of the compression coil spring 206. In this way, due to the moderation pin 204 being displaced to the inside of the housing hole 202, the energizing force of the compression coil spring 206 is increased.

Therefore, when the thrust which the driver applies to the knob portion 176 in order to tilt the operating rod 162 is cancelled, the energizing force of the compression coil spring 206 which attempts to thrust the moderation pin 204 out of the housing hole 202 displaces the moderation pin 204 to the side of the bottom portion of the concave portion 28. Accordingly, with respect to the operating rod 162, when the external force applied to the knob portion 176 in order to tilt the operating rod 162 is cancelled, the moderation pin 204 automatically returns to a reference position positioned at the bottom portion of the concave portion 28 due to the energizing force of the compression coil spring 206.

Further, as described above, when the operating rod 162 is tilted against the energizing force of the compression coil spring 206, and in accordance therewith, the tip of the moderation pin 204 reaches the vicinity of the moderation portion 208, as described above, the moderation pin 204 which has come into point-contact with the moderation portion 208 comes into point-contact with the concave portion 28 at the side lower than the moderation portion 208 with the moderation portion 208 being as a boundary, and comes into contact with the concave portion 28 at the side upper than the moderation portion 208. In this way, due to the moderation pin 204 coming into contact with the both of upper and lower sides with the moderation portion 208 being as a boundary, the operating rod 162 cannot be tilted any longer by the thrust which has been applied to the operating knob 170, and it is, in a manner of speaking, made to be in a state in which tilting of the operating rod 162 is regulated.

In this way, due to tilting of the operating rod 162 being regulated, the driver who is thrusting the operating rod 162 can recognize that the operating rod 162 has been made to tilt until the moderation pin 204 is positioned in the vicinity of the moderation portion 208 without directly viewing the operating knob 170.

Moreover, even in such a regulated state, provided that the operating knob 170 is thrust by thrust equal to or greater than the prior thrust, the tip of the moderation pin 204 runs onto the side upper than the moderation portion 208, and moreover, the moderation pin 204 can be displaced to the side of the opening end of the concave portion 28.

However, because the angle of inclination of the concave portion 28 at the side upper than the moderation portion 208 is greater than that up to that time (i.e., at the side lower than the moderation portion 208), the amount of displacement of the moderation pin 204 to the inside of the housing hole 202 is made to be large, and the energizing force of the compression coil spring 206 is further increased more than the energizing force up to that time.

Accordingly, as the ease of operation at the time of thrusting the operating knob 170 is made heavier than that up to that time (in a state in which the tip of the moderation pin 204 is coming into contact with the concave portion 28 at the side lower than the moderation portion 208), and it can be easily recognized that the operating rod 162 has been tilted in a state in which the moderation pin 204 has been coming into contact with the concave portion 28 at the side upper than the moderation portion 208.

Next, processings with respect to the signals $S_X$ and $S_Y$ in the microcomputer 114 will be described on the basis of the flowchart of FIG. 15.

Figure 15:
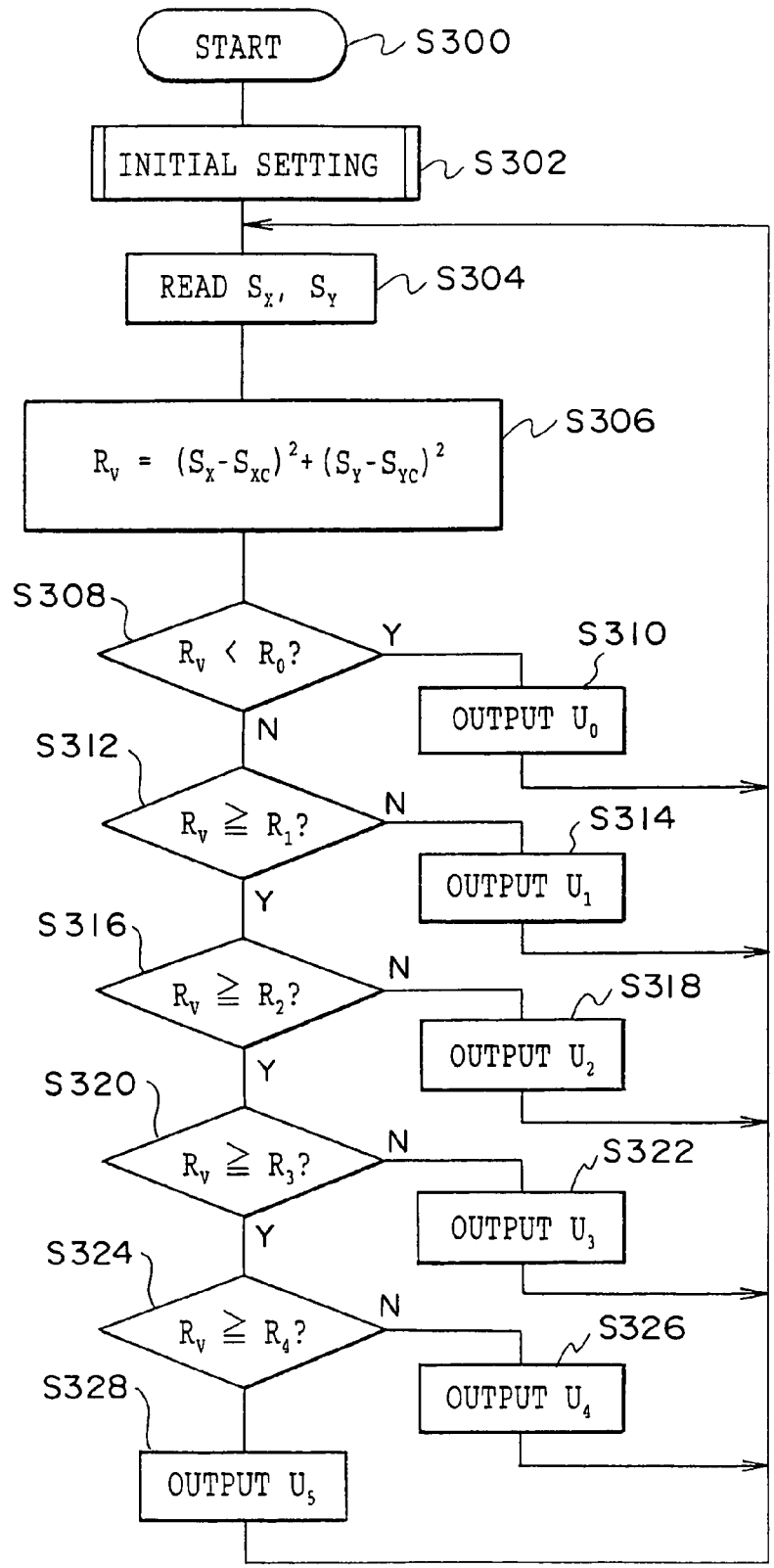
FIG. 15 is a flowchart showing a flow of signal processings at a signal output component.

In the present embodiment, when a signal processing program shown in the flowchart of FIG. 15 is started at step 300, an initial setting is carried out at step 302, and moreover, a digital signal $S_X$ based on an output voltage of the potentiometer 104 and a digital signal $S_Y$ based on an output voltage of the potentiometer 88 are read at step 304.

Next, at step 306, a value $R_V$ is operated on the basis of the following equation (1).

$$R_V = (S_X - S_{SC})^2 + (S_Y - S_{YC})^2 \qquad (1)$$

Here, $S_{SC}$ in equation (1) is a value corresponding to a central value $EX_C$ between a minimum output voltage $E_{XO}$ and a maximum output voltage $E_{XV}$ of the potentiometer 104, and $S_{YC}$ in equation (1) is a value corresponding to a central value $E_{YC}$ between a minimum output voltage $E_{YO}$ and a maximum output voltage $E_{YV}$ of the potentiometer 88.

Figure 16:
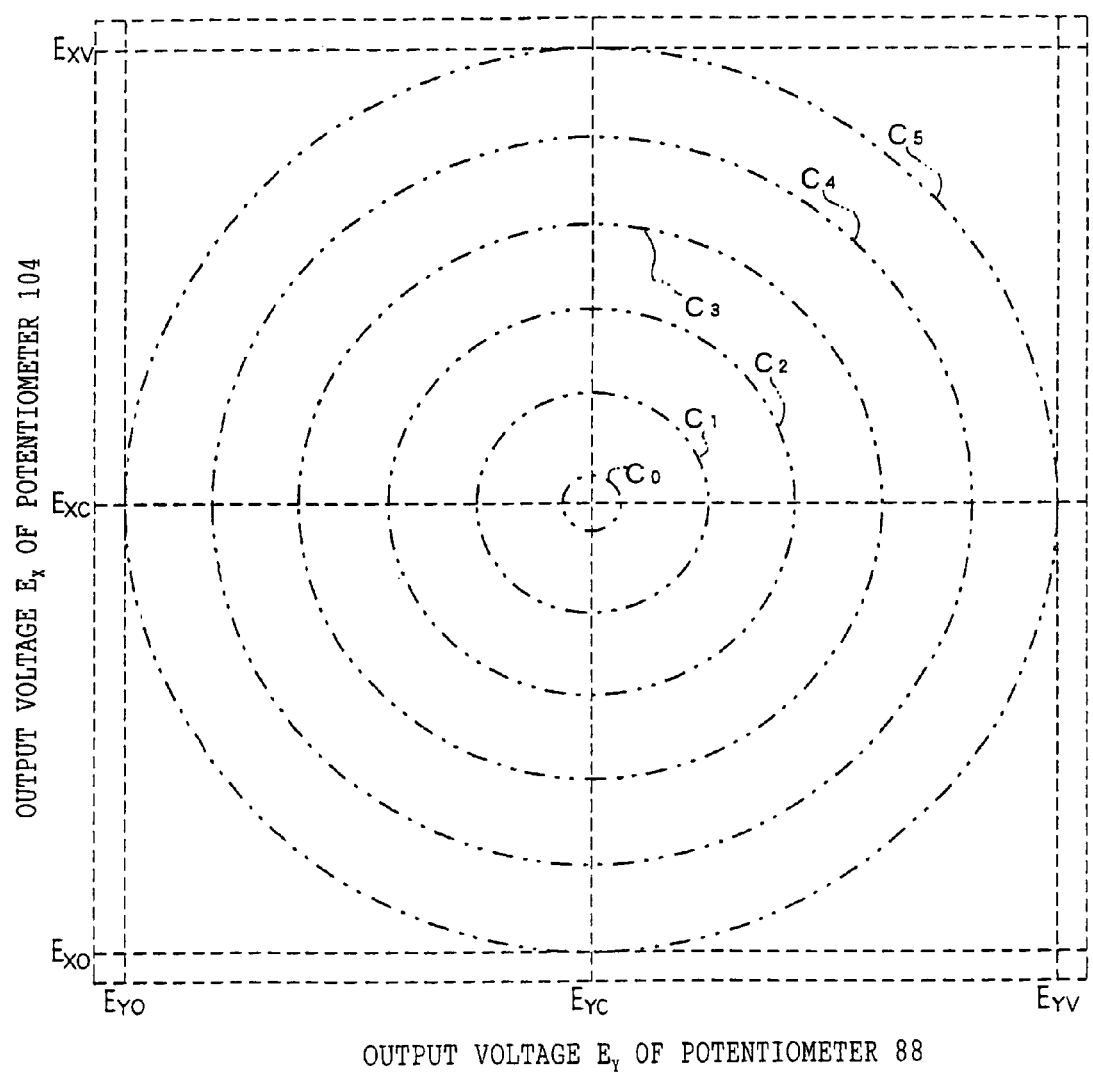
FIG. 16 is a diagram conceptually showing a relationship between signal levels of the output signals at the position detecting component and ranges of setting the signal levels used for judging.

Namely, the value $R_V$ determined by this equation (1) corresponds to the square of the straight distance from the central values $E_{XC}$ and $E_{YC}$ to the output voltages $E_X$ and $E_Y$ of the potentiometers 104 and 88 on the conceptual coordinate system in FIG. 16.

Next, at step 308, it is judged whether or not the value $R_V$ is less than a value $R_0$. Here, the value $R_0$ is a value corresponding to the square of the radius of a conceptual circle $C_0$ shown in FIG. 16, and when it is judged that the value $R_V$ is less than the value $R_0$ at step 308, i.e., the output voltages $E_X$ and $E_Y$ of the potentiometers 104 and 88 are positioned at the inside of the circle $C_0$, the routine proceeds to step 310.

At step 310, a signal $U_0$ meaning that the operating rod 162 has been basically not tilted is outputted from the CPU 116. When the signal $U_0$ is outputted from the CPU 116, the routine returns to step 304, and the processings described above are repeated.

Further, when the judgement at step 308 is negative, the routine proceeds to step 312. At step 312, it is judged whether or not the value $R_V$ is equal to or greater than a value $R_1$. Here, the value $R_1$ is a value corresponding to the square of the radius of a circle $C_1$ which is concentric with the conceptual circle $C_0$ and has a diameter greater than that of the circle $C_0$ shown in FIG. 16. Namely, at step 312, it is judged whether or not the output voltages $E_X$ and $E_Y$ of the potentiometers 104 and 88 are positioned on the circle $C_0$, or between the circle $C_1$ and the circle $C_0$.

When it is judged at step 312 that the value $R_V$ is less than the value $R_1$, the routine proceeds to step 314. At step 314, a signal $U_1$ in which information on the tilting direction and information on the amount of displacement from the reference position of the operating rod 162 based on the signals $S_X$ and $S_Y$ is outputted from the CPU 116. When the signal $U_1$ is outputted from the CPU 116, the routine returns to step 304, and the processings described above are repeated.

On the other hand, when the judgement at step 312 is affirmative, the routine proceeds to step 316. At step 316, it is judged whether or not the value $R_V$ is equal to or greater than a value $R_2$. Here, the value $R_2$ is a value corresponding to the square of the radius of a circle $C_2$ which is concentric with the conceptual circle $C_0$ and has a diameter greater than that of the circle $C_1$ shown in FIG. 16. Moreover, the circle $C_2$ further corresponds to the above-described state at the time when the moderation pin 204 is positioned in the vicinity of the moderation portion 208 and both of the upper and lower sides of the moderation portion 208 come into contact with the moderation pin 204.

Namely, at step 316, it is judged whether or not the output voltages $E_X$ and $E_Y$ of the potentiometers 104 and 88 are positioned on the circle $C_1$, or between the circle $C_2$ and the circle $C_1$.

When it is judged at step 316 that the value $R_V$ is less than the value $R_2$, the routine proceeds to step 318. In contrast thereto, when it is judged at step 316 that the value $R_V$ is equal to or greater than the value $R_2$, the routine proceeds to step 320.

When it is judged at step 316 that the value $R_V$ is less than the value $R_2$ and the routine proceeds to step 318, at step 318, a signal $U_2$ in which information on the tilting direction and information on the amount of displacement from the reference position of the operating rod 162 based on the signals $S_X$ and $S_Y$ is outputted from the CPU 116. When the signal $U_2$ is outputted from the CPU 116, the routine returns to step 304, and the processings described above are repeated.

Further, when the judgement at step 316 is affirmative and the routine proceeds to step 320, at step 320, it is judged whether or not the value $R_V$ is equal to or greater than a value $R_3$. Here, the value $R_3$ is a value corresponding to the square of the radius of a circle $C_3$ which is concentric with the conceptual circle $C_0$ and has a diameter greater than that of the circle $C_2$ shown in FIG. 16. Namely, at step 320, it is judged whether or not the output voltages $E_X$ and $E_Y$ of the potentiometers 104 and 88 are positioned on the circle $C_2$, or between the circle $C_3$ and the circle $C_2$. When the judgement at step 320 is negative, the routine proceeds to step 322, and when the judgement is affirmative, the routine proceeds to step 324.

When it is judged at step 320 that the value $R_V$ is less than the value $R_3$ and the routine proceeds to step 322, at step 322, a signal $U_3$ in which information on the tilting direction and information on the amount of displacement from the reference position of the operating rod 162 based on the signals $S_X$ and $S_Y$ is outputted from the CPU 116. When the signal $U_3$ is outputted from the CPU 116, the routine returns to step 304, and the processings described above are repeated.

Further, when the judgement at step 320 is affirmative and the routine proceeds to step 324, at step 324, it is judged whether or not the value $R_V$ is equal to or greater than a value $R_4$. Here, the value $R_4$ is a value corresponding to the square of the radius of a circle $C_4$ which is concentric with the conceptual circle $C_0$ and has a diameter greater than that of the circle $C_3$ shown in FIG. 16. Namely, at step 324, it is judged whether or not the output voltages $E_X$ and $E_Y$ of the potentiometers 104 and 88 are positioned on the circle $C_3$, or between the circle $C_4$ and the circle $C_3$. When the judgement at step 324 is negative, the routine proceeds to step 326, and when the judgement is affirmative, the routine proceeds to step 328.

When it is judged at step 324 that the value $R_V$ is less than the value $R_4$ and the routine proceeds to step 326, at step 326, a signal $U_4$ in which information on the tilting direction and information on the amount of displacement from the reference position of the operating rod 162 based on the signals $S_X$ and $S_Y$ is outputted from the CPU 116. When the signal $U_4$ is outputted from the CPU 116, the routine returns to step 304, and the processings described above are repeated.

On the other hand, when the judgement at step 324 is affirmative and the routine proceeds to step 328, at step 328, a signal $U_5$ in which information on the tilting direction and information on the amount of displacement from the reference position of the operating rod 162 based on the signals $S_X$ and $S_Y$ is outputted from the CPU 116. The value $U_5$ is outputted when the value $R_V$ is equal to or greater than the value $R_4$ and less than or equal to the value $R_5$. Here, the value $R_5$ is a value corresponding to the square of the radius of a circle $C_5$ which is concentric with the conceptual circle $C_0$ and has a diameter greater than that of the circle $C_4$ shown in FIG. 16. Namely, when the output voltages $E_X$ and $E_Y$ of the potentiometers 104 and 88 are positioned on the circle $C_4$ or $C_5$, or between the circle $C_5$ and the circle $C_4$, the signal $U_5$ is outputted from the CPU 116. When the signal $U_5$ is outputted from the CPU 116, the routine returns to step 304, and the processings described above are repeated.

In this way, a signal $U_P$ (P=0, 1, 2, 3, 4, 5) including information on the tilting direction and information on the amount of displacement from the reference position of the operating rod 162 is outputted from the CPU 116 of the microcomputer 114.

Next, processings with respect to the signals $U_P$ in the control unit 132 will be described on the basis of the flowchart of FIG. 17.

Figure 17:
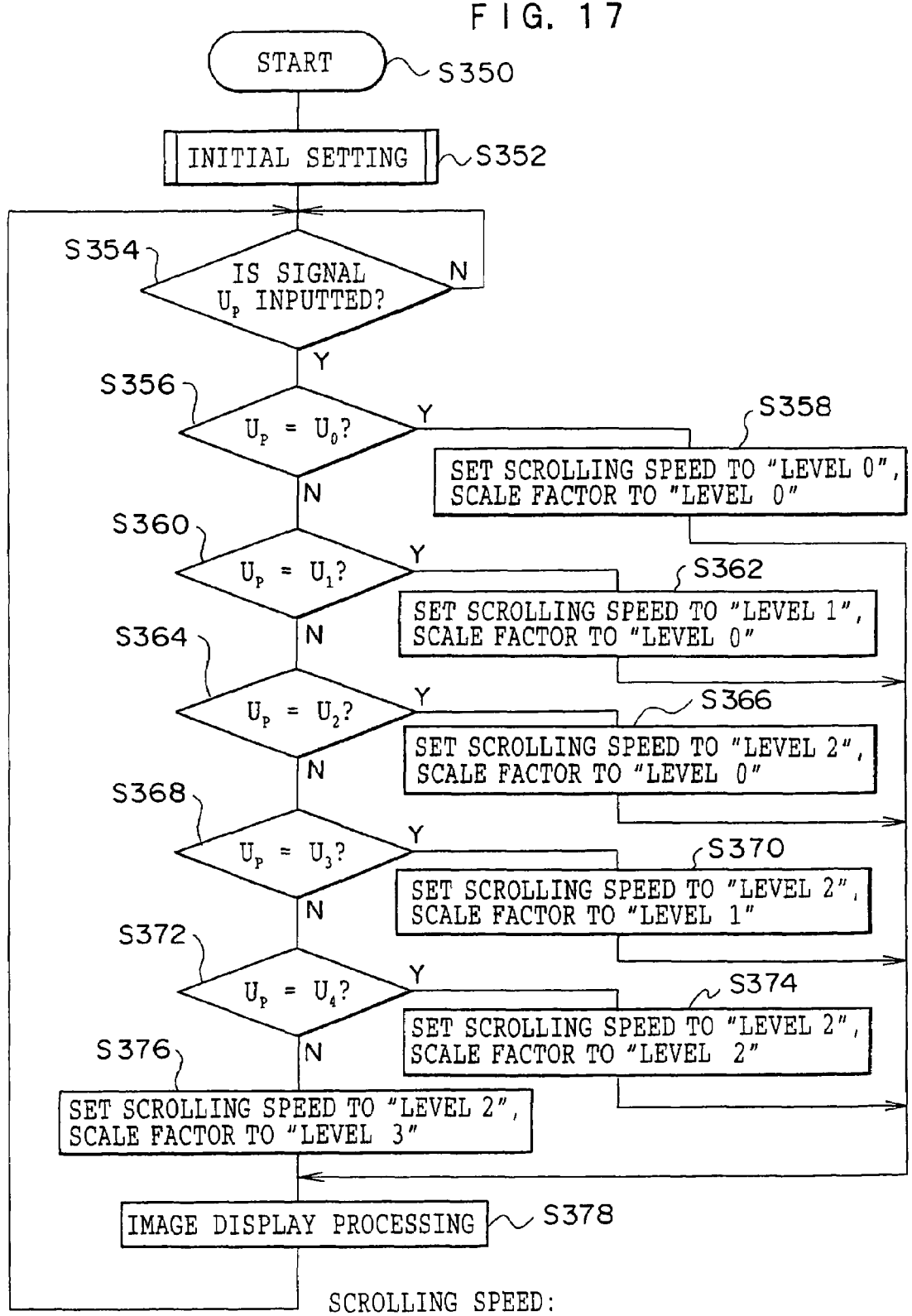
FIG. 17 is a flowchart showing a flow of signal processings at a signal output component.

When a signal processing program shown in the flowchart of FIG. 17 is started at step 350, the routine proceeds to step 352, and an initial setting is carried out. Here, the CPU 134 reads the scale factor data out of the RAM 136, and it is set such that a map image is displayed on the monitor television 140 on a scale factor corresponding to the scale factor data when the operating rod 162 is not being operated. When this initial setting is completed, the routine proceeds to step 354.

At step 354, it is judged whether or not a signal $U_P$ is inputted to the CPU 134 of the control unit 132 from the CPU 116 of the microcomputer 114. Only in the case in which this judgement is affirmative, the routine proceeds to the next step 356.

At step 358, it is judged whether or not the signal $U_P$ is the signal $U_0$. When this judgement is affirmative, the routine proceeds to step 358, and when the judgement is negative, the routine proceeds to step 360.

When the judgement at step 356 is affirmative and the routine proceeds to step 358, i.e., when the operating rod 162 is basically not being tilted, a scrolling speed is set to "level 0" and a scale factor is set to "level 0". Here, this scale factor at "level 0" is to be a scale factor when the operating rod 162 is not being operated which was set at step 352. When this setting is completed, the routine proceeds to step 378.

On the other hand, when the judgement at step 356 is negative and the routine proceeds to step 360, it is judged whether or not the signal $U_P$ is the signal $U_1$. When this judgement is affirmative, the routine proceeds to step 362, and when the judgement is negative, the routine proceeds to step 364.

When the judgement at step 360 is affirmative and the routine proceeds to step 362, i.e., when the output voltages $E_X$ and $E_Y$ of the potentiometers 104 and 88 are positioned on the circle $C_0$, or between the circle $C_1$ and the circle $C_0$ (refer to FIG. 16), the scrolling speed is set to "level 1" and the scale factor is set to "level 0". When this setting is completed, the routine proceeds to step 378.

On the other hand, when a judgement at step 360 is negative and the routine proceeds to step 364, it is judged whether or not the signal $U_P$ is the signal $U_2$. When this judgement is affirmative, the routine proceeds to step 366, and when this judgement is negative, the routine proceeds to step 368.

When the judgement at step 364 is affirmative and the routine proceeds to step 366, i.e., when the output voltages $E_X$ and $E_Y$ of the potentiometers 104 and 88 are positioned on the circle $C_1$, or between the circle $C_2$ and the circle $C_1$ (refer to FIG. 16), the scrolling speed is set to "level 2" and the scale factor is set to "level 0". When this setting is completed, the routine proceeds to step 378 described above.

On the other hand, when a judgement at step 364 is negative and the routine proceeds to step 368, it is judged whether or not the signal $U_P$ is the signal $U_3$. When this judgement is affirmative, the routine proceeds to step 370, and when this judgement is negative, the routine proceeds to step 372.

When the judgement at step 368 is affirmative and the routine proceeds to step 370, i.e., when the output voltages $E_X$ and $E_Y$ of the potentiometers 104 and 88 are positioned on the circle $C_2$, or between the circle $C_3$ and the circle $C_2$ (refer to FIG. 16), the scrolling speed is set to "level 2" and the scale factor is set to "level 1". When this setting is completed, the routine proceeds to step 378 described above.

On the other hand, when the judgement at step 368 is negative and the routine proceeds to step 372, it is judged whether or not the signal $U_P$ is the signal $U_4$. When this judgement is affirmative, the routine proceeds to step 374, and when this judgement is negative, the routine proceeds to step 376.

When the judgement at step 372 is affirmative and the routine proceeds to step 374, i.e., when the output voltages $E_X$ and $E_Y$ of the potentiometers 104 and 88 are positioned on the circle $C_3$, or between the circle $C_4$ and the circle $C_3$ (refer to FIG. 16), the scrolling speed is set to "level 2" and the scale factor is set to "level 2". When this setting is completed, the routine proceeds to step 378.

On the other hand, when the judgement at step 372 is negative and the routine proceeds to step 376, i.e., when the output voltages $E_X$ and $E_Y$ of the potentiometers 104 and 88 are positioned on the circle $C_4$ or $C_5$, or between the circle $C_5$ and the circle $C_4$ (refer to FIG. 16), because the signal $U_P$ is the signal $U_5$, the scrolling speed is set to "level 2" and the scale factor is set to "level 3". When this setting is completed, the routine proceeds to step 378.

At step 378, a picture signal corresponding to the scrolling speed and the scale factor which are set at one of steps 358, 362, 366, 370, 374, and 376 is outputted to the monitor television 140. When such a picture signal corresponding to a scrolling speed and a scale factor is outputted to the monitor television 140 from the CPU 134 of the control unit 132, the routine returns to step 354, and the processings from step 354 through step 378 which were described above are repeatedly carried out.

Next, the map image displayed on the display screen of the monitor television 140 will be described.

Figure 18:
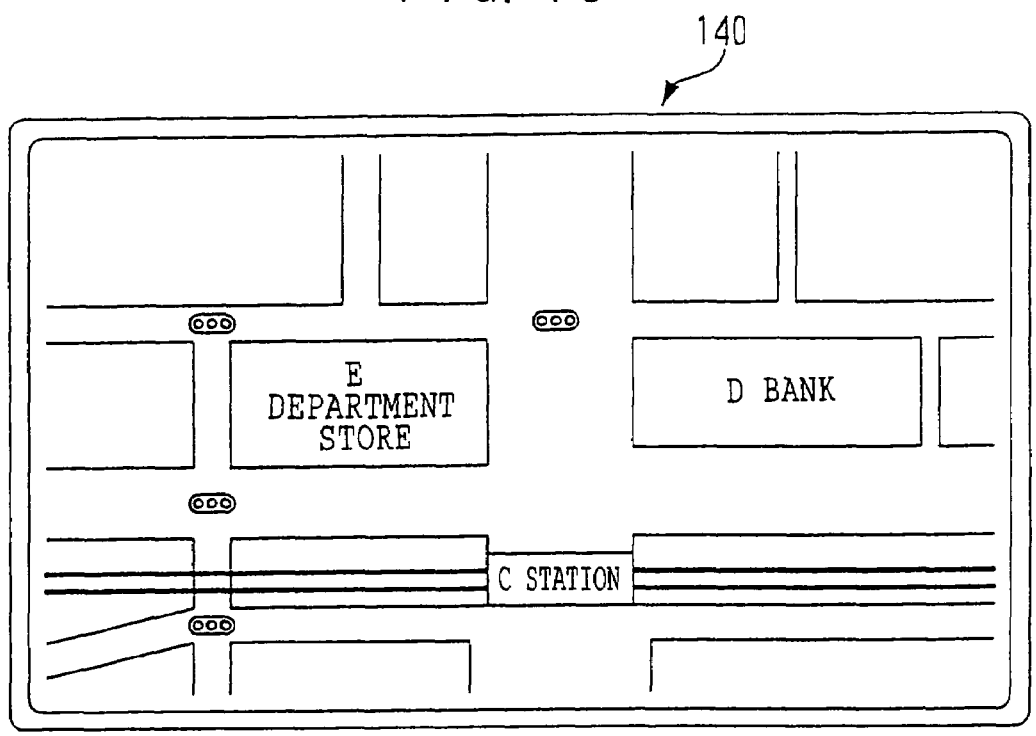
FIG. 18 is one example of a display screen of a monitor component.

When the signal $U_0$ is inputted to the CPU 134, and the scrolling speed is set to "level 0" and the scale factor is set to "level 0", i.e., when the operating rod 162 is basically not being tilted, as shown in FIG. 18, the map image is displayed on the display screen of the monitor television 140 at a predetermined scale factor, i.e., on the scale factor of the map image which was displayed before the operating rod 162 was operated (the scale factor when the operating rod is not being operated. Hereinafter the scale factor before operating). In this case, the map image is displayed on the display screen of the monitor television 140 in a scrolling stopping state in which the scrolling speed is made to be 0.

Figure 19:
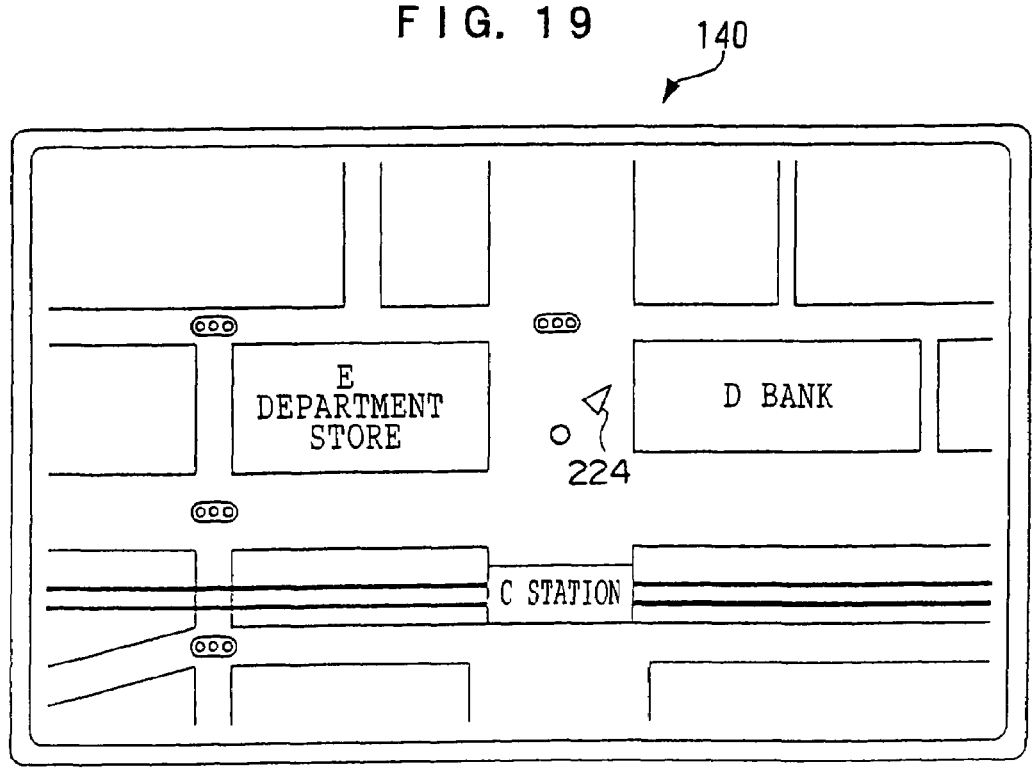
FIG. 19 is one example of the display screen of the monitor component.

Further, when the signal $U_1$ is inputted to the CPU 134, and the scrolling speed is set to "level 1" and the scale factor is set to "level 0", i.e., when the output voltages $E_X$ and $E_Y$ of the potentiometers 104 and 88 are positioned on the circle $C_0$, or between the circle $C_1$ and the circle $C_0$ (refer to FIG. 16), in a state in which the map image is displayed on the display screen of the monitor television 140 on the above-described scale factor before operating (refer to FIG. 18), as shown in FIG. 19, the CPU 134 displays a triangle (cursor) 224 whose vertex portion points to a direction corresponding to the tilting direction of the operating rod 162 on the center of the display screen of the monitor television 140, and moves the map image data in the direction opposite to the direction of the triangle 224 (direction of the vertex portion) at a predetermined speed, and displays as if the map image displayed on the display screen is moved in the direction of the triangle 224 (i.e., the display screen is scrolled in the direction of the triangle 224).

Figure 20:
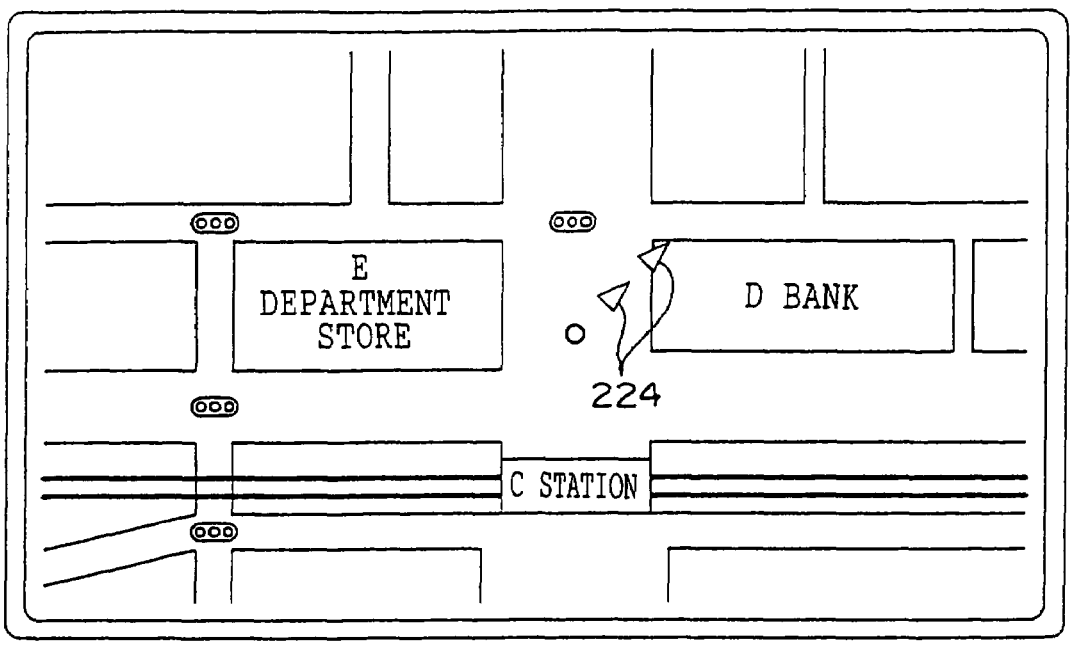
FIG. 20 is one example of the display screen of the monitor component.

Moreover, when the signal $U_2$ is inputted to the CPU 134, and the scrolling speed is set to "level 2" and the scale factor is set to "level 0", i.e., when the output voltages $E_X$ and $E_Y$ of the potentiometers 104 and 88 are positioned on the circle $C_2$, or between the circle $C_2$ and the circle $C_1$ (refer to FIG. 16), in a state in which the map image is displayed on the display screen of the monitor television 140 on the above-described scale factor before operating (refer to FIG. 18), and when the signal $U_2$ is inputted to the CPU 134, as shown in FIG. 20, the CPU 134 displays two triangles (cursors) 224 whose vertex portions point to a direction corresponding to the tilting direction of the operating rod 162 in series on the center of the display screen of the monitor television 140, and moves the map image data in the direction opposite to the direction of the triangles 224 (direction of the vertex portions) at a speed higher than that in a case in which the signal $U_1$ is inputted, and displays as if the map image displayed on the display screen is moved in the direction of the triangles 224.

In contrast to these cases (the cases in which the signals $U_0$, $U_1$, and $U_2$ are inputted to the CPU 134), in cases which will be described hereinafter, a scrolling speed of the map image is made to be constant, and only a scale factor of the map image is varied.

Figure 21:
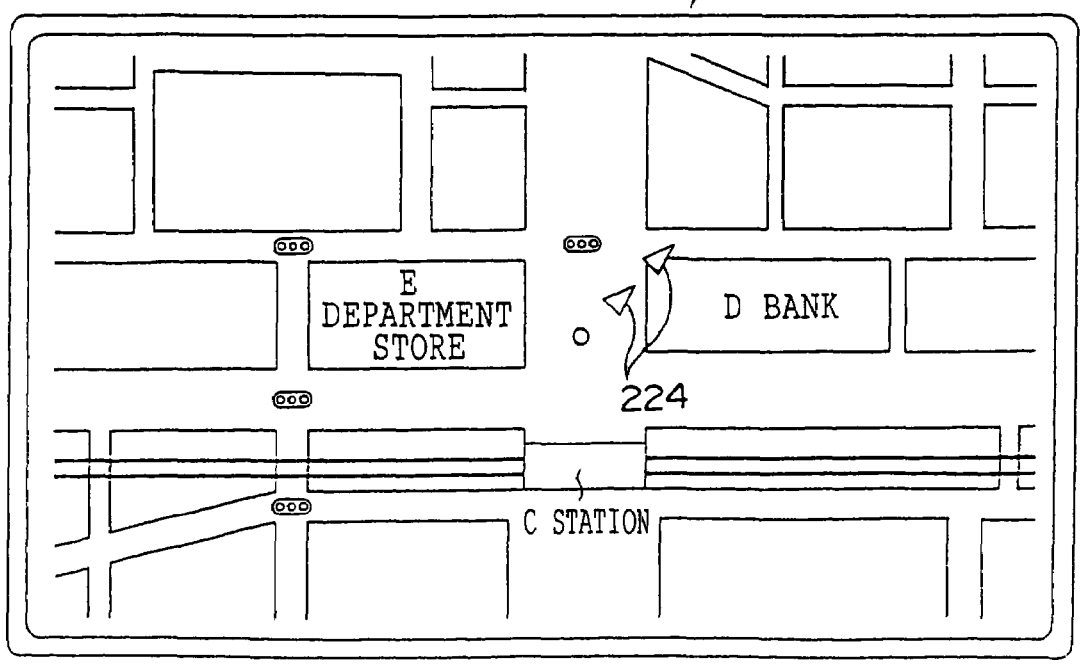
FIG. 21 is one example of the display screen of the monitor component.

When the signal $U_3$ is inputted to the CPU 134, and the scrolling speed is set to "level 2" and the scale factor is set to "level 1", i.e., when the output voltages $E_X$ and $E_Y$ of the potentiometers 104 and 88 are positioned on the circle $C_2$, or between the circle $C_3$ and the circle $C_2$ (refer to FIG. 16), in a state in which the map image is displayed on the display screen of the monitor television 140 on a scale factor which is one stage wider than the above-described scale factor before operating (refer to FIG. 18), as shown in FIG. 21, the CPU 134 displays the triangles (cursors) 224 whose vertex portions point to a direction corresponding to the tilting direction of the operating rod 162 on the center of the display screen of the monitor television 140, and moves the map image data in the direction opposite to the direction of the triangles 224 (direction of the vertex portions) at a scrolling speed which is the same as in the case in which the signal $U_2$ is inputted, and displays as if the map image displayed on the display screen is moved in the direction of the triangles 224 (i.e., the display screen is scrolled in the direction of the triangles 224).

Figure 22:
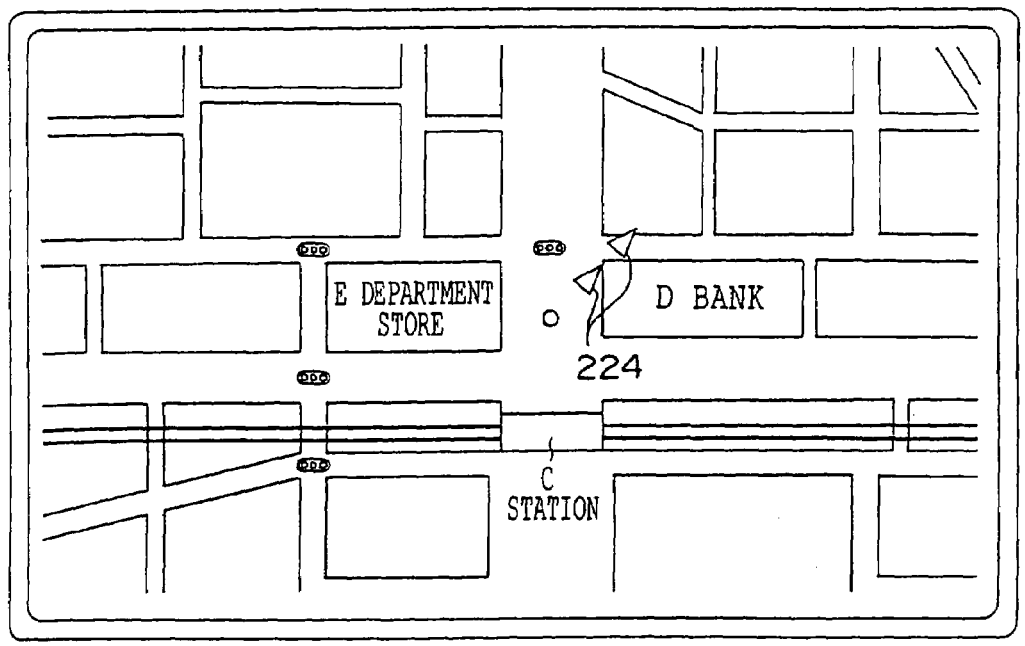
FIG. 22 is one example of the display screen of the monitor component.

Further, when the signal $U_4$ is inputted to the CPU 134, and the scrolling speed is set to "level 2" and the scale factor is set to "level 2", i.e., when the output voltages $E_X$ and $E_Y$ of the potentiometers 104 and 88 are positioned on the circle $C_3$, or between the circle $C_4$ and the circle $C_3$ (refer to FIG. 16), in a state in which the map image is displayed on the display screen of the monitor television 140 on a scale factor which is two stages wider than the above-described scale factor before operating (refer to FIG. 18), as shown in FIG. 22, the CPU 134 displays the triangles (cursors) 224 whose vertex portions point to a direction corresponding to the tilting direction of the operating rod 162 on the center of the display screen of the monitor television 140, and moves the map image data in the direction opposite to the direction of the triangles 224 (the direction of the vertex portions) at a scrolling speed which is the same as in the cases in which the signals $U_2$ and $U_3$ are inputted, and displays as if the map image displayed on the display screen is moved in the direction of the triangles 224 (i.e., the display screen is scrolled in the direction of the triangles 224).

Figure 23:
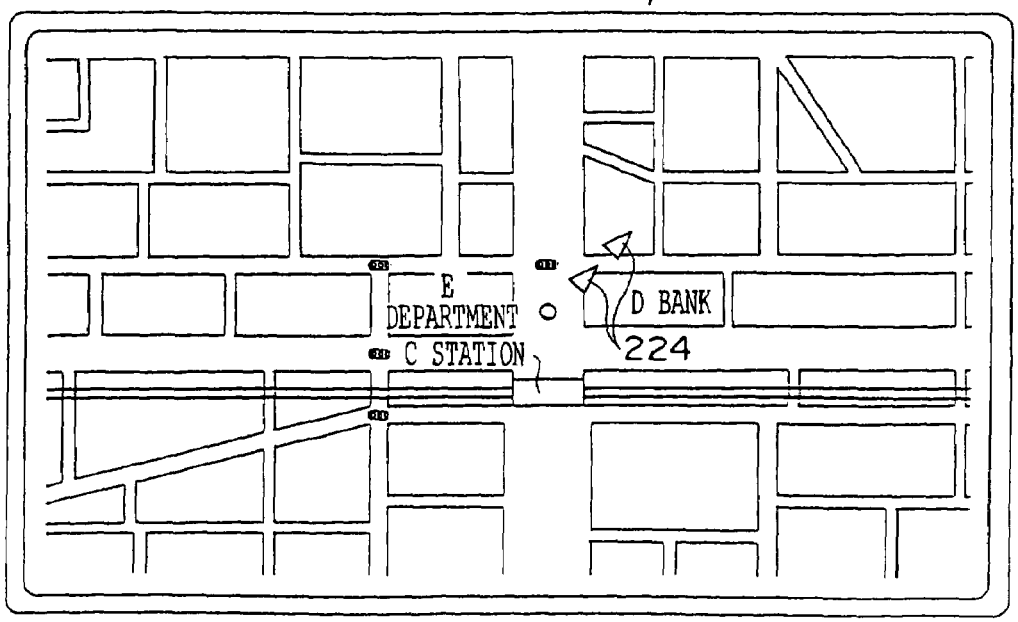
FIG. 23 is one example of the display screen of the monitor component.

Moreover, when the signal $U_5$ is inputted to the CPU 134, and the scrolling speed is set to "level 2" and the scale factor is set to "level 3", i.e., when the output voltages $E_X$ and $E_Y$ of the potentiometers 104 and 88 are positioned on the circle $C_4$ or $C_5$, or between the circle $C_5$ and the circle $C_4$ (refer to FIG. 16), in a state in which the map image is displayed on the display screen of the monitor television 140 on a scale factor which is three stages wider than the above-described scale factor before operating (refer to FIG. 18), as shown in FIG. 23, the CPU 134 displays the triangles (cursors) 224 whose vertex portions point to a direction corresponding to the tilting direction of the operating rod 162 on the center of the display screen of the monitor television 140, and moves the map image data in the direction opposite to the direction of the triangles 224 (the direction of the vertex portions) at a scrolling speed which is the same as in the cases in which the signals $U_2$, $U_3$, and $U_4$ are inputted, and displays as if the map image displayed on the display screen is moved in the direction of the triangles 224 (i.e., the display screen is scrolled in the direction of the triangles 224).

Note that, in the present embodiment, the scrolling speed and the scale factor are varied by the control unit 132 in accordance with the above-described signal $U_P$. However, the invention is not limited thereto. The variations in the above-described scrolling speed and the above-described scale factor, or a ratio of these variations may be varied by the control unit 132.

As described above, the operator can obtain a desired scrolling speed of a map image and a desired scale factor of a map image by merely adjusting an amount of displacement from the reference position of the operating rod 162 (i.e., the position of the operating rod 162).

Further, in the monitor display control apparatus 11, when the value $R_V$ corresponding to the amount of displacement from the reference position of the operating rod 162 is less than the value $R_3$ corresponding to a predetermined amount, i.e., in the control unit 132, when the output voltages $E_X$ and $E_Y$ of the potentiometers 104 and 88 are positioned at the inside of the conceptual circle $C_3$ shown in FIG. 16, a scrolling speed of the map image is made to vary in accordance with a signal $U_P$ (P=0, 1, 2) including the information on the amount of displacement from the reference position of the operating rod 162. In addition thereto, a scale factor of the map image is set to a predetermined scale factor. Namely, even when $U_P$ (P=0, 1, 2) is inputted to the CPU 134 of the control unit 132, the map image is displayed on the display screen of the monitor television 140 on a scale factor which is the same as that in a case in which the map image is stopped with respect to the cursor 224 (in a display state corresponding to the signal $U_0$). Moreover, when the operating rod 162 is displaced by an amount less than the predetermined amount from the reference position (when the value $R_V$ is equal to or greater than the value $R_0$, and less than the value $R_3$), the scrolling speed of the map image is varied in accordance with the value $R_V$ corresponding to the amount of displacement from the reference position of the operating rod 162. Accordingly, the operator can change only the scrolling speed in a state in which the scale factor is being maintained to be constant by merely adjusting the amount of displacement from the reference position of the operating rod 162 within a range in which the amount of displacement from the reference position of the operating rod 162 does not reach the predetermined amount (a range on the conceptual circle $C_0$, or between the circle $C_3$ and $C_0$ shown in FIG. 16, i.e., at the inside of the circle $C_3$).

On the other hand, when the value $R_V$ corresponding to the amount of displacement from the reference position of the operating rod 162 is equal to or greater than the value $R_3$ corresponding to a predetermined amount, a scale factor of the map image is varied to a scale factor different from the above-described scale factor before operating in accordance with a signal $U_P$ (P=3, 4, 5) including the information on the amount of displacement from the reference position. In addition thereto, the scrolling speed of the map image is set to a speed when the $R_V$ corresponding to the amount of displacement from the reference position of the operating rod 162 reaches the value $R_3$ corresponding to a predetermined amount. Namely, on the display screen of the monitor television 140, the map image is scrolled at a scrolling speed which is the same as in the case in which the $R_V$ corresponding to the amount of displacement from the reference position of the operating rod 162 becomes the value $R_3$ corresponding to a predetermined amount (a scrolling speed which is the same as in the case in which the signal $U_P$ (P=0, 1, 2) is inputted to the CPU 134 of the control unit 132. Moreover, the scale factor of the map image is varied in accordance with the value $R_V$ corresponding to the amount of displacement from the reference position of the operating rod 162. Accordingly, the operator can vary only the scale factor in a state in which the scrolling speed of the map image is being maintained to be constant by merely adjusting the amount of displacement from the reference position of the operating rod 162 within a range in which such that the value $R_V$ corresponding to the amount of displacement from the reference position of the operating rod 162 is made to be equal to or greater than the value $R_3$ corresponding to a predetermined amount (a region on the conceptual circle $C_3$ or $C_5$, or between the circle $C_5$ and $C_3$ shown in FIG. 16).

In this way, the operator can select whether the scrolling speed of the map image is varied or the scale factor of the map image is varied in accordance with whether or not the amount of displacement from the reference position of the operating rod 162 is made to be less than a predetermined amount. Moreover, in each case of varying the scrolling speed of the map image and varying the scale factor of the map image, an extent of the variation can be momentarily varied in accordance with an extent of the amount of displacement from the reference position of the operating rod 162. Accordingly, an intention of the operator can be further reflected with respect to the operation of scrolling the map image.

Further, when the scrolling speed of the map image is varied, i.e., when the value $R_V$ corresponding to the amount of displacement from the reference position of the operating rod 162 is less than a value $R_3$ corresponding to a predetermined amount, in the control unit 132, in accordance with the information on the amount of displacement from the reference position of the operating rod 162 included in the signal $U_P$ (P=0, 1, 2), the scrolling speed of the map image after being varied is varied to a high speed and a low speed in accordance with the amount of displacement from the reference position of the operating rod 162 being increased and decreased. On the other hand, when the scale factor of the map image is varied, i.e., when the value $R_V$ corresponding to the amount of displacement from the reference position of the operating rod 162 is equal to or greater than the value $R_3$ corresponding to a predetermined amount, in the control unit 132, in accordance with the information on the above-described amount of displacement from the reference position included in the signal $U_P$ (P=3, 4, 5), the scale factor of the map image after being varied is varied to a scale factor corresponding to a wide-range display and a scale factor corresponding to an enlarged display in accordance with the amount of displacement from the reference position of the operating rod 162 being increased and decreased.

In the monitor display control apparatus 11, for example, when the operating rod 162 is gradually displaced from the reference position, the scrolling speed is gradually accelerated in a state in which the map image is on the scale factor before operating. When the operator continues to displace the operating rod 162 and the value $R_V$ corresponding to the amount of displacement from the reference position of the operating rod 162 becomes the value $R_3$ corresponding to a predetermined amount, the scrolling speed is made to be constant at a speed at this time. When the operating rod 162 is continued to be displaced such that the amount of displacement from the reference position of the operating rod 162 is made to be even greater, the scale factor of the map image is gradually made greater, that is, gradually displayed in a wider-range, while the scrolling speed is constant.

Furthermore, when the operating rod 162 is gradually displaced to the reference position side from this state (the amount of displacement from the reference position of the operating rod 162 is reduced), the scale factor of the map image is gradually made little, and is gradually displayed so as to be enlarged in a state in which the scrolling speed is constant. When the operating rod 162 is continued to be displaced such that the amount of displacement from the reference position of the operating rod 162 is made to be even less, and the value $R_V$ corresponding to the amount of displacement from the reference position of the operating rod 162 becomes the value $R_3$ corresponding to a predetermined amount, the scale factor of the map image is made to be the above-described scale factor before operating. When the operator continues to displace the operating rod 162 to the reference position side, the scrolling speed is gradually reduced in a state in which the map image is on the above-described scale factor before operating.

Namely, even if a period of time when the operating rod 162 is displaced is the same, because the less the amount of displacement from the reference position of the operating rod 162 is, the shorter the moved distance of the cursor on the map image (the moved distance measured with the graduation on the map), the display screen of the monitor television 140 is made to be a display suitable for minutely operating a movement of a map image. In contrast thereto, even if a period of time when the operating rod 162 is displaced is the same, because the greater the amount of displacement from the reference position of the operating rod 162 is, the longer the moved distance of the cursor on the map image is, the display screen of the monitor television 140 is made to be a display suitable for roughly operating a movement of a map image. Accordingly, the invention is suitable for reflecting an intention of the operator in the variations in the scrolling speed and the scale factor of a map image.

Further, on the monitor display control apparatus 11, because the operator can recognize (confirm) the boundary portion (i.e., the circle $C_3$) between the region inside the conceptual circle $C_3$ and the region outside the circle $C_3$ shown in FIG. 16 by the moderate feeling generated due to the concave portion 28 coming into contact with the moderation pin 204 with the both of the upper and lower sides with the moderation portion 208 shown in FIG. 14 being as a boundary, there is no need to visually recognize the operating rod 162. Accordingly, the monitor display control apparatus 11 can even more improve the ease of operation of scrolling the map image with an intention of the operator being reflected at the time of scrolling the map image.

As described above, the monitor display control apparatus 11 relating to the embodiment of the invention can improve the ease of operation of scrolling the map image with an intention of the operator being reflected at the time of scrolling the map image.

Note that, in the present embodiment, one of the six types of patterns in which the scrolling speeds (three stages) and the scale factors of a map image (three stages) are combined is set in accordance with an amount of displacement of the operating rod 162. However, the invention is not limited thereto. The scrolling speeds and the scale factors of a map image are not limited to be in three stages, and may be in any plural stages. Namely, the invention may be structured so as to set one of plural types of patterns in which scrolling speeds in plural stages and scale factors of a map image in plural stages are combined.

Note that, in the present embodiment, when the scale factor of the map image is varied, the scale factor of the map image is varied in stages. However, the invention is not limited thereto. The invention may be structured so as to include, for example, stepless zooming in which the scale factor continuously varies along with a position of the operating rod 162 when the scale factor of the map image is varied.

Moreover, when the scale factor of the map image is varied, the control in which the scrolling speed is adjustably controlled in accordance with a operating time of the operating rod 162 may be combined with the control of the control unit 132 relating to the above-described present embodiment. Provided that such a control is carried out, the problem that the visual sense of an operator cannot follow the scrolling of the map image because the scrolling speed is at a high speed for a long time can be solved.

Further, in the present embodiment, the scrolling speed and the scale factor of the map image are set on the basis of the value $R_V$ determined by an operation. However, the invention is not limited thereto. It may be structured such that patterns of combinations of the above-described scrolling speeds and the above-described scale factors which correspond to the positions of the operating rod 162 are stored in advance, and the above-described patterns are read every time when a position of the operating rod 162 is detected, and the scrolling speed and the scale factor of the map image are varied.

Even in these cases, in the same way as in the embodiment of the invention described above, when a map image is scrolled, the ease of operation of scrolling the map image can be improved with an intention of the operator being reflected.

What is claimed is:

1. A monitor display control apparatus, which inputs a screen control signal to a monitor component, displays a map image at a predetermined scale factor on a display screen of the monitor component, displays a cursor on a center of the display screen, and relatively moves the map image with respect to the cursor, the monitor display control apparatus comprising:

a manual operation component, which can be manually displaced from a reference position;

a position detecting component, which detects a position of the operation component;

a signal output component, which outputs an operation signal including information on an amount of displacement of the operation component from the reference position on the basis of a detected result at the position detecting component; and a display control component, which sets a predetermined relative moving speed of the map image and a predetermined scale factor of the map image on the basis of the information on the amount of displacement of the operation component included in the operation signal and outputs the screen control signal corresponding to the relative moving speed and the scale factor which have been set, wherein, when the amount of manual displacement of the operation component is less than a predetermined distance from said reference direction, the display control component varies the relative moving speed of the map image to a predetermined relative moving speed in accordance with the amount of displacement of the operation component and sets the scale factor of the map image to the predetermined scale factor, and when the amount of manual displacement of the operation component is equal to or greater than the predetermined distance, the display control component sets the relative moving speed of the map image to a speed at the time when the amount of displacement of the operation component reaches the predetermined amount, and varies the scale factor of the map image in accordance with the amount of additional displacement of the operation component beyond said predetermined distance such that the relative moving speed of the map image does not increase with the amount of additional displacement of the operation component beyond said predetermined distance, but the scale factor of the map does increase with the amount of additional displacement of the operation component beyond said predetermined distance.

2. The monitor display control apparatus of claim 1 further comprising a moderation component, which provides a feeling of moderation to the operation component when the distance of displacement of the operation component reaches the predetermined amount.

3. The monitor display control apparatus of claim 2, wherein the feeling of moderation is energizing force different from that before the distance of displacement of the operation component reaches the predetermined amount.

4. The monitor display control apparatus of claim 1, wherein the number of the cursors varies in accordance with the relative moving speed of the map image.

5. The monitor display control apparatus of claim 1, wherein a tip of the cursor shows a relative moving direction of the map image.

6. A monitor display control method, in which a screen control signal is input to a monitor component, a map image is displayed at a predetermined scale factor on a display screen of the monitor component, a cursor is displayed on a center of the display screen, and the map image is relatively moved with respect to the cursor, the monitor display control method comprising:
 (a) detecting a position of a manual operation component, which can be manually displaced a selected distance from a reference position;
 (b) outputting an operation signal including information on an amount of displacement of the operation component from the reference position on the basis of the detected position; and
 (c) setting a predetermined relative moving speed of the map image and a predetermined scale factor of the map image on the basis of the information on the amount of distance of displacement of the operation component from said reference position included in the operation signal, and outputting the screen control signal corresponding to the relative moving speed and the scale factor which have been set wherein, in (c), when the distance of displacement of the operation component from the reference position is less than a predetermined amount, the relative moving speed of the map image is varied in accordance with a predetermined relative moving speed in accordance with the amount of displacement of the operation component, and the scale factor of the map image is set to the predetermined scale factor in accordance with the amount of displacement of the operation component, and when the distance of displacement of the operation component is equal to or greater than the predetermined amount, the relative moving speed of the map image is set to a speed at the time when the amount of displacement of the operation component reaches the predetermined amount, and varies the scale factor of the map image in accordance with an amount of additional displacement of the operation component beyond said predetermined distance such that the relative moving speed of the map image does not increase with the amount of additional displacement of the operation component beyond said predetermined distance, but the scale factor of the map does increase with the amount of additional displacement of the operation component beyond said predetermined distance.

7. The monitor display control method of claim 6 further comprising providing a feeling of moderation to the operation component when the distance of displacement of the operation component reaches the predetermined amount.

8. The monitor display control method of claim 7, wherein the feeling of moderation is energizing force different from that before the distance of displacement of the operation component reaches the predetermined amount.

9. The monitor display control method of claim 6, wherein the number of the cursors varies in accordance with the relative moving speed of the map image.

10. The monitor display control method of claim 6, wherein a tip of the cursor shows the relative moving direction of the map image.

* * * * *